(12) United States Patent
Wang et al.

(10) Patent No.: US 8,481,181 B2
(45) Date of Patent: Jul. 9, 2013

(54) EXCHANGE COUPLED MAGNETIC ELEMENTS

(75) Inventors: Xiaobin Wang, Chanhassen, MN (US); Kaizhong Gao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 160 days.

(21) Appl. No.: 13/077,946

(22) Filed: Mar. 31, 2011

(65) Prior Publication Data

US 2012/0251845 A1    Oct. 4, 2012

(51) Int. Cl.
*G11B 5/65* (2006.01)

(52) U.S. Cl.
USPC .................. 428/812; 428/836; 428/836.1

(58) Field of Classification Search
None
See application file for complete search history.

(56) References Cited

U.S. PATENT DOCUMENTS

| | | | |
|---|---|---|---|
| 6,754,020 B1 * | 6/2004 | Hikosaka et al. | 360/59 |
| 7,796,428 B2 | 9/2010 | Redon | |
| 7,846,563 B2 | 12/2010 | Berger et al. | |
| 7,862,912 B2 | 1/2011 | Hellwig et al. | |
| 7,869,309 B2 * | 1/2011 | Mihalcea et al. | 369/13.14 |
| 2004/0166371 A1 * | 8/2004 | Berger et al. | 428/694 T |
| 2004/0196593 A1 * | 10/2004 | Yasui et al. | 360/135 |
| 2004/0240327 A1 | 12/2004 | Sendur et al. | |
| 2005/0202287 A1 | 9/2005 | Lu et al. | |
| 2006/0269797 A1 * | 11/2006 | Lu et al. | 428/834 |
| 2007/0026263 A1 | 2/2007 | Kubota et al. | |
| 2007/0159721 A1 * | 7/2007 | Honda et al. | 360/131 |
| 2007/0172705 A1 * | 7/2007 | Weller et al. | 428/827 |
| 2008/0026255 A1 | 1/2008 | Das et al. | |
| 2009/0040644 A1 * | 2/2009 | Lu et al. | 360/59 |
| 2009/0262457 A1 | 10/2009 | Rivkin et al. | |
| 2010/0055503 A1 | 3/2010 | Shimatsu et al. | |
| 2010/0110576 A1 | 5/2010 | Akagi et al. | |
| 2010/0110577 A1 | 5/2010 | Weller et al. | |
| 2010/0129685 A1 * | 5/2010 | Gao et al. | 428/827 |
| 2010/0177605 A1 | 7/2010 | Mallary | |
| 2010/0182714 A1 * | 7/2010 | Kanbe et al. | 360/59 |
| 2010/0208386 A1 * | 8/2010 | Lauhoff | 360/86 |
| 2010/0209737 A1 * | 8/2010 | Bian et al. | 428/827 |
| 2010/0302679 A1 | 12/2010 | Kamata et al. | |
| 2010/0309577 A1 | 12/2010 | Gao et al. | |
| 2011/0003175 A1 | 1/2011 | Valcu et al. | |
| 2011/0007558 A1 | 1/2011 | Mryasov et al. | |
| 2011/0020669 A1 | 1/2011 | Sayama et al. | |
| 2011/0044099 A1 * | 2/2011 | Dieny | 365/171 |
| 2011/0048628 A1 | 3/2011 | Sato | |

(Continued)

OTHER PUBLICATIONS

Gavrila et al. "Magnetic Materials for Advanced Magnetic Recording Media." Journal of Optoelectronics and Advanced Materials. vol. 5, No. 4. p. 919-932. Dec. 2003.

(Continued)

*Primary Examiner* — Kevin Bernatz
(74) *Attorney, Agent, or Firm* — Hollingsworth Davis, LLC

(57) ABSTRACT

Approaches to reduce switching field distribution in energy assisted magnetic storage devices involve first and second exchange coupled magnetic elements. The first magnetic elements have anisotropy, $H_{k1}$, volume, $V_1$ and the second magnetic elements are magnetically exchange coupled to the first magnetic elements and have anisotropy $H_{k2}$, and volume $V_2$. The thermal stability of the exchange coupled magnetic elements is greater than about 60 $k_BT$ at a storage temperature of about 300 K. The magnetic switching field distribution, SFD, of the exchange coupled magnetic elements is less than about 200% at a predetermined magnetic switching field and a predetermined assisting switching energy.

14 Claims, 22 Drawing Sheets

U.S. PATENT DOCUMENTS

2011/0069537 A1  3/2011  Gao et al.
2011/0235205 A9* 9/2011  Lu et al. ........................ 360/59
2012/0212998 A1* 8/2012  Ranjan et al. ................ 365/158
2012/0250404 A1 10/2012 Wang et al.

OTHER PUBLICATIONS

Kryder et al. "Heat Assisted Magnetic Recording." Proceedings of the IEEE. vol. 96, No. 11. p. 1810-1835. Nov. 2008.

Lou et al. "Demonstration of multilevel cell spin transfer switching in MgO magnetic tunnel junctions." Applied Physics Letters. vol. 93, 242502. 2008.

Matsumoto et al. "Thermally Assisted Magnetic Recording." FUJITSU Sci. Tech. J. vol. 42, No. 1. p. 158-167. Jan. 2006.

Microwave-Assisted Magnetic Recording for Next Gen HDD. Press Release edited by StorageNewsletter.com on Nov. 30, 2010.

Nolan et al. "Effect of Composite Designs on Writability and Thermal Stability of Perpendicular Recording Media." IEEE Transactions on Magnetics. vol. 47, No. 1. p. 63-68. Jan. 2011.

Prejbeanu et al. "Thermally assisted MRAM." J. Phys.: Condens. Matter. vol. 19, No. 16. p. 1-26. 2007.

Ross, CA. "Patterned Magnetic Recording Media." Annu. Rev. Mater. Res. vol. 31. p. 203-235. 2001.

Stoll, C. "Numerical Simulations on Microwave Assisted Magnetic Recording (MAMR)." Undergraduate Research Presentations. Apr. 8, 2009.

Wang et al. "Spintronic Memristor Through Spin-Torque-Induced Magnetization Motion." IEEE Electron Device Letters. vol. 30, No. 3. p. 294-297. Mar. 2009.

Wang et al. "Spin Torque Induced Magnetization Switching Variations." IEEE Transactions on Magnetics. vol. 45, No. 4. p. 2038-2041. Apr. 2009.

Wang et al. "Magnetization Switching in Spin Torque Random Access Memory: Challenges and Opportunities." CMOS Processors and Memories, Springer. 2010.

Wu et al. "Studies of switching field and thermal energy barrier distributions in a FePt nanoparticle system." Journal of Applied Physics. vol. 93, No. 10. p. 7181-7183. May 2003.

Jan. 29, 2013, File History for U.S. Appl. No. 13/077,948.

* cited by examiner

EXCHANGE COUPLED MAGNETIC ELEMENTS

SUMMARY

Approaches to reduce switching field distribution in energy assisted magnetic storage devices involve first and second exchange coupled magnetic elements. The first magnetic elements have anisotropy, $H_{k1}$, volume, $V_1$ and the second magnetic elements are magnetically exchange coupled to the first magnetic elements and have anisotropy $H_{k2}$, and volume $V_2$. The thermal stability of the exchange coupled magnetic elements is greater than about 60 $k_BT$ at a storage temperature of about 300 K. The magnetic switching field distribution, SFD, of the exchange coupled magnetic elements is less than about 200% at a predetermined magnetic switching field and a predetermined assisting switching energy.

DETAILED DESCRIPTION

Figure 1A:
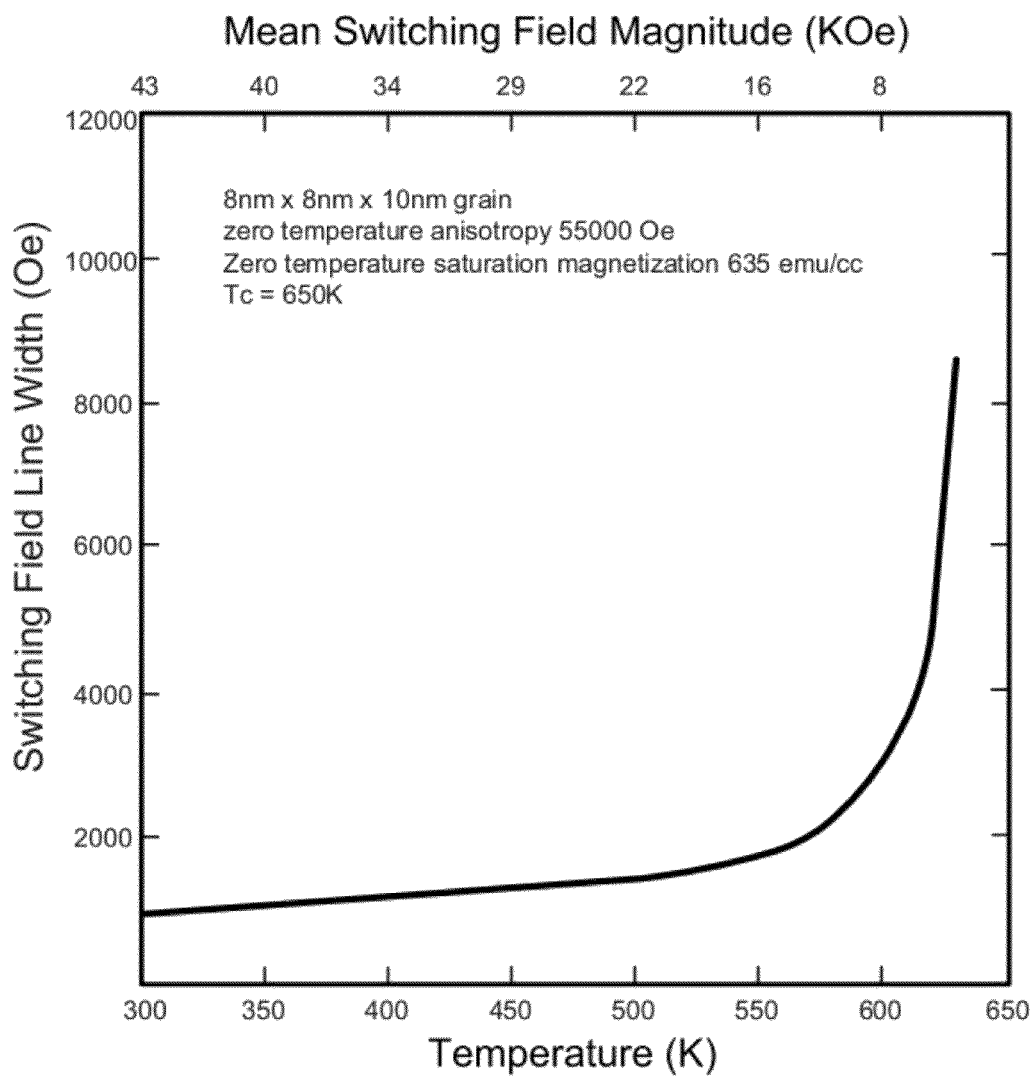
FIG. 1A is a graph that shows the switching field line width verses temperature and mean switching field for a magnetic element in accordance with some embodiments.

The demand for increased areal densities in memory devices may involve a corresponding decrease in the size of magnetic storage elements. Decreasing the size of the magnetic storage elements can decrease the thermal stability of the elements. The thermal energy barrier for a magnetic grain to switch between two stabilized states is proportional to the product of the uniaxial magnetic anisotropy constant, Ku, and the volume (V) of the magnetic grains. To provide adequate data storage, the product Ku V should meet a stability criterion, e.g., about 60 to about 90 $k_B T$, where $k_B$ is Boltzman's constant and T is temperature in degrees Kelvin. Magnetic materials formed of high Ku magnetic grains form materials with high coercivity, Hc. Mass production of recording heads capable of generating sufficient magnetic writing field, referred to as the switching field, to write to such high Hc materials can be problematic.

Various techniques for writing to materials that are made of high anisotropy magnetic elements have been suggested and/or implemented. Some techniques, denoted herein as energy assisted magnetic recording (EAMR) involve applying additional predetermined energy to the magnetic system to assist in the writing the magnetic elements. One energy assisted technique relies on the decreasing anisotropy of a magnetic material with temperature. In heat assisted magnetic recording (HAMR), the magnetic material is heated until its anisotropy drops to a writable value concurrently with the application of the magnetic writing field. Another technique, denoted microwave assisted magnetic recording (MAMR), involves coercivity reduction through external radio frequency field excitation applied along with the writing magnetic field.

As discussed above, the thermal stability of the magnetic storage elements at room temperature may be measured in terms of years. Another criterion that is applicable to magnetic data storage is the distribution of the magnetic switching field to switch memory elements from one magnetization state to another. The variation in the switching field is referred to as the switching field distribution (SFD). Switching field distribution varies with the application of the additional energy in EAMR as discussed further below.

Some scenarios discussed herein exemplify how a predetermined storage temperature thermal stability criterion and a predetermined write temperature SFD can be achieved through the use of coupled magnetic elements. Some of these scenarios involve coupled magnetic elements used in HAMR or MAMR to achieve a predetermined SFD when the assist energy (e.g., heat or microwave) is applied and to achieve a predetermined thermal stability criterion at the storage temperature. Coupled magnetic elements may be used to achieve a predetermined switching field distribution and a predetermined storage temperature thermal stability for magnetic storage devices that use various types of energy assistance when switching magnetic storage elements from one state to another.

In each case, the coupling between the magnetic elements is tuned to achieve a predetermined switching energy distribution at the conditions used to write to the magnetic elements and also achieves a predetermined thermal stability at the storage temperature of the magnetic elements.

Embodiments discussed herein are applicable to control the thermal stability and energy assisted SFD for HAMR or MAMR magnetic storage media. The approaches discussed herein involving HAMR or MAMR magnetic media, can be applied to continuous (non-patterned) magnetic recording media and to patterned media, such as discrete track media (DTM) and bit patterned media (BPM). Some approaches discussed herein can also be applied to energy assisted magnetoresistive random access memory (EA-MRAM), e.g., heat assisted magnetoresistive random access memory (HA-MRAM).

For heat assisted magnetic storage devices, as a consequence of the writing coercivity dependence on temperature, the SFD increases along with a reduction in the mean switching field as the magnetic medium is heated towards the Curie temperature. Controlling the SFD at the write temperature can be accomplished in conjunction with maintaining a storage temperature thermal stability criterion, e.g., 60-90 $k_B T$, where T may be a storage temperature of about 300 K.

Considering HAMR used in conjunction with a continuous (non-patterned) magnetic media, the individual grains have anisotropy $H_{k0}$ and saturation magnetization $M_{s0}$ at T=0. At finite temperatures, the temperature dependent $H_k(T)$ and $M_s(T)$ can be written:

$$H_k(T) = H_{k0}\left(1 - \frac{T}{T_e}\right)^2 \quad [1]$$

$$M_s(T) = M_{s0}\left(1 - \frac{T}{T_e}\right)^2 \quad [2]$$

During the HAMR write process, the SFD arises from several sources. First, the intrinsic media anisotropy distribution arises from media anisotropy magnitude and angular distributions. This is a main SFD source for the conventional (non-HAMR) write process. A second SFD source is the material Curie temperature distribution. A third SFD source is related to the dynamical effects of thermal fluctuation on magnetization switching at temperature, T, and time scale, t. Thermal fluctuation induced SFD exists in conventional recording, however, it is more severe in HAMR recording due to elevated temperatures. As temperature increases, the mean switching field decreases and the switching field line width increases. Switching field line width is related to magnetic transition width and the signal to noise ratio (SNR) of the magnetic device.

Figure 1B:
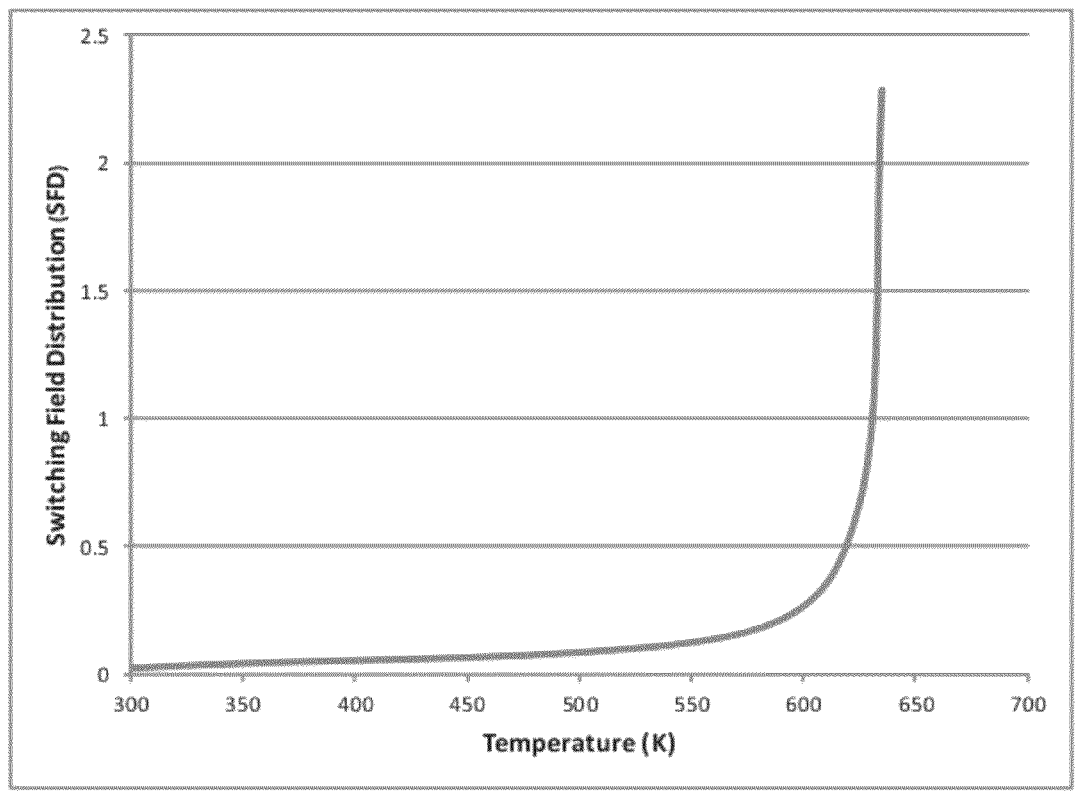
FIG. 1B is a graph of switching field distribution as a function of temperature for the example magnetic element of FIG. 1A.

FIG. 1A is a graph of the relationship between switching field line width verses temperature for a magnetic element according to some embodiments disclosed herein. FIG. 1A shows the switching field line width verses temperature and mean switching field for magnetization switching at 10 nanoseconds, an 8 nm×8 nm×10 nm grain size, $H_{k0}$ of 55000 Oe, $M_{s0}$ of 635 emu/cc and $T_c$ of 650K, and assuming the quadratic temperature dependence of $H_k(T)$ and $M_s(T)$ as in [1] and [2]. For any point on the graph of FIG. 1A, it is possible to determine the SFD for this case by dividing the switching field line width SFW at any temperature value by the mean switching field $H_c$ at that temperature. FIG. 1B is a graph of the SFD as a function of temperature for the example magnetic element of FIG. 1A. Although in this example, $H_k(T)$ and $M_s(T)$ exhibit quadratic temperature dependence, other forms of temperature dependence are possible.

MAMR is a technology based on coercivity reduction through external radio frequency field excitation with a frequency close to the media grain resonance frequency. The switching field may be considered to be a dc field and the assisting field is a transverse circularly polarized with amplitude $H_r$ and frequency $\omega$.

One contribution to MAMR SFD comes from the dynamic effect of the RF field excitation. For the MAMR writing process, the intrinsic media anisotropy distribution causes media resonant frequency distribution. For an RF excitation at a given frequency, this produces a distribution in the assisting energy strength and gives MAMR a dynamic SFD. An additional SFD source arises from RF distribution.

Embodiments disclosed herein involve reduction of the SFD of a magnetic device during transient application of energy to the device (e.g., heat or microwave energy) through magnetization exchange coupling between magnetic elements. In these embodiments, exchange coupling between magnetic elements is employed to achieve the dual constraints of a predetermined SFD distribution during the time that the assisting energy is applied, denoted herein as an energy assisted SFD (EASFD) and a predetermined thermal stability at the storage temperature of the device, e.g., about 300K.

The magnetic device includes at least two magnetic elements, comprising materials of possibly different anisotropies, $H_{k1}$, $H_{k2}$, possibly different saturation magnetizations, $M_{s1}$, $M_{s2}$, and/or possibly different volumes, $V_1$, $V_2$. In some cases, the two magnetic elements may be in the form of separate material grains. The two magnetic elements may have the same aspect ratio or different aspect ratios and/or may have the same thickness and/or different thicknesses.

Figure 2A:
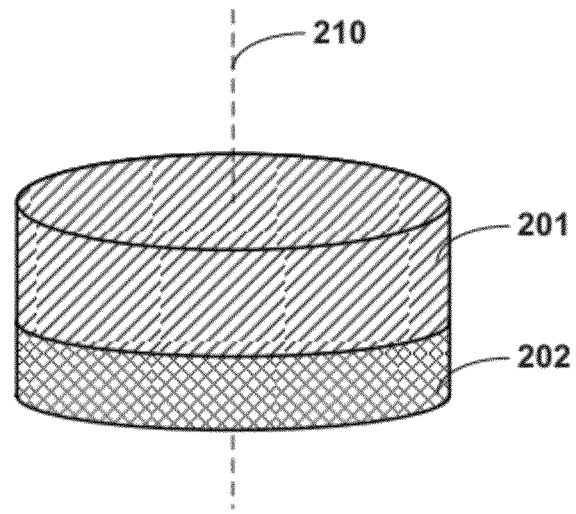
FIG. 2A illustrates exchange coupled magnetic elements having about the same geometric aspect ratio, but not necessarily the same thickness, aligned vertically along an axis, the magnetic elements may be exchange coupled to achieve a predetermined thermal stability and a predetermined energy assisted switching field distribution in accordance with some embodiments.
Figure 2B:
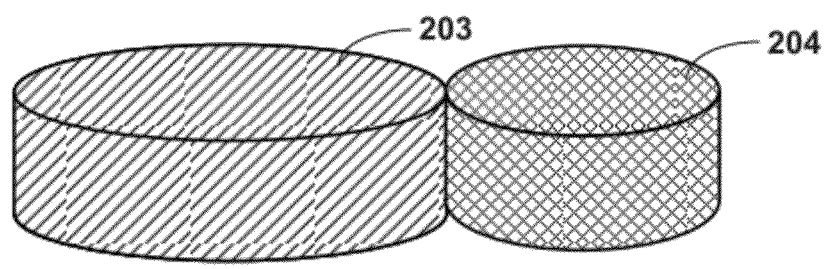
FIG. 2B illustrates exchange coupled magnetic elements, aligned horizontally in a plane, which may be exchange coupled to achieve a predetermined thermal stability and a predetermined energy assisted switching field distribution in accordance with some embodiments.

FIG. 2A illustrates exchange coupled magnetic elements 201, 202 having about the same geometric aspect ratio, but not necessarily the same thickness, aligned vertically along axis 210. In some cases, the magnetic elements may be aligned horizontally in a plane, as illustrated in FIG. 2B. The magnetic elements 203, 204 of FIG. 2B have different aspect ratios and the same thickness.

Figure 2C:
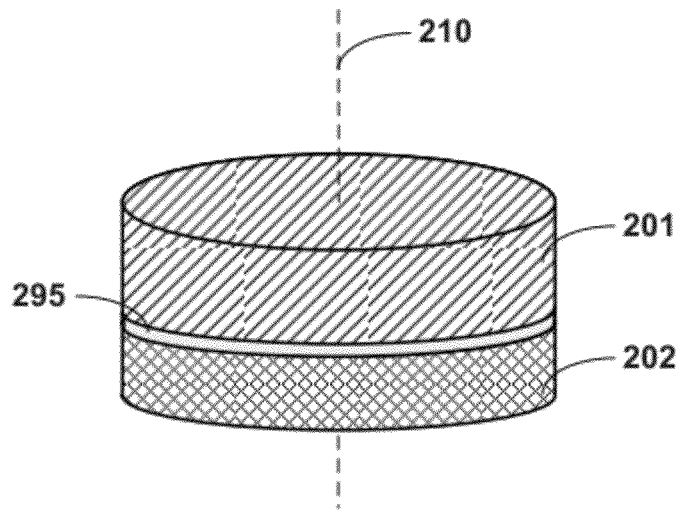
FIGS. 2C and 2D show exchange coupled magnetic elements, separated by an exchange coupling layer, which may be exchange coupled to achieve a predetermined thermal stability and a predetermined energy assisted switching field distribution in accordance with some embodiments.
Figure 2D:
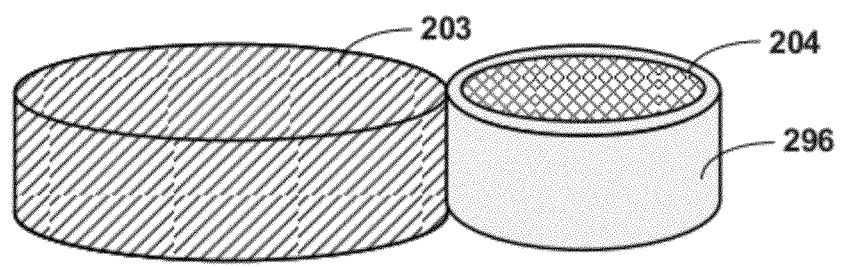

As shown in FIGS. 2C and 2D, the coupled magnetic elements 201, 202 (FIG. 2C), 203, 204 (FIG. 2D) may be separated by an interface layer 295, 296. The exchange coupling between the coupled magnetic elements 201, 202, 203, 204 may be increased or decreased by adjusting the composition, thickness, and/or deposition parameters of the interface layer 295, 296.

Figure 2E:
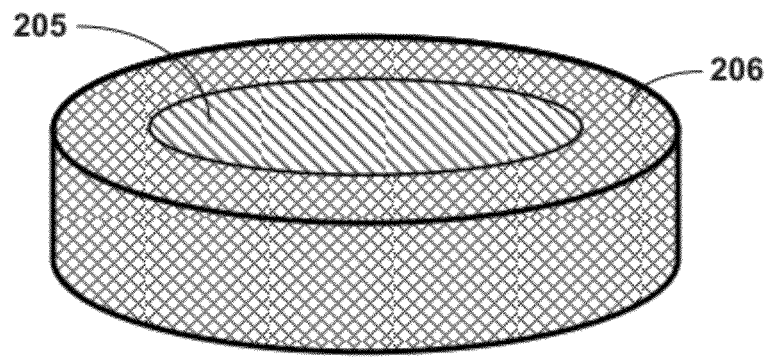
FIG. 2E illustrates a configuration of exchange coupled magnetic elements which may be exchange coupled to achieve a predetermined thermal stability and a predetermined energy assisted switching field distribution in accordance with some embodiments, wherein the material of a first magnetic element surrounds a second magnetic element.
Figure 2F:
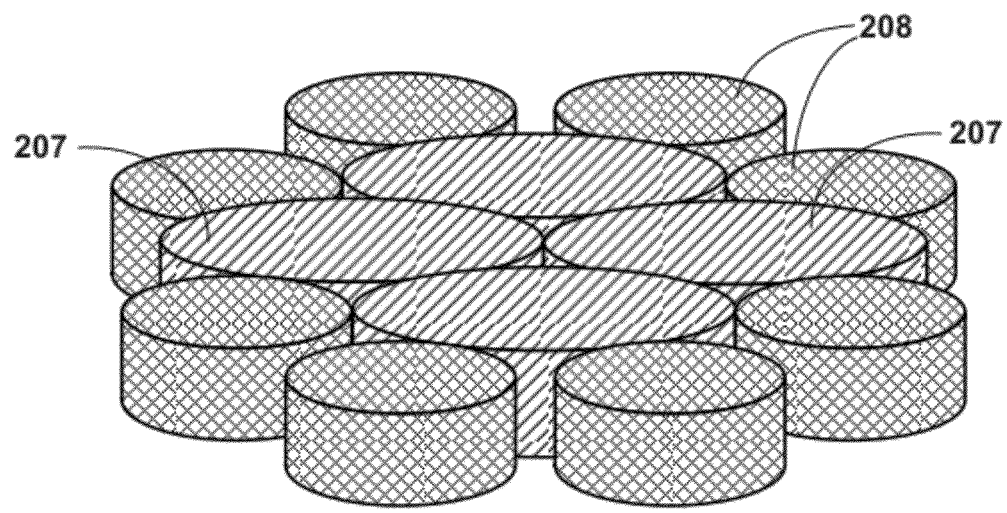
FIG. 2F illustrates one or more first magnetic elements surrounded by and exchange coupled with one or more second magnetic elements in accordance with some embodiments.

FIG. 2E illustrates yet another configuration in which the material of a first magnetic element 205 surrounds a second magnetic element 206. The first magnetic element may fully or partially surround the second magnetic element. The ratio between magnetic elements may not be one-to-one. For example, as illustrated in FIG. 2F, there may be one or more first magnetic elements 207 surrounded by one or more second magnetic elements 208.

As previously discussed, the first and second magnetic elements may have differing anisotropies, saturation magnetizations, and/or volumes, among other parameters. The first and second magnetic elements may have differing Curie temperatures. For example, in an arrangement that facilitates switching, the first magnetic element may have a lower Curie temperature than the second magnetic element with the first magnetic element arranged closer to the magnetic switching field source than the second magnetic element. In this arrangement, the first magnetic element would switch first with the magnetic moment of the first magnetic element aiding in the switching of the second magnetic element.

The anisotropy constant, $K_{1,2}$ for first and second exchange coupled magnetic elements having differing anisotropies, $H_{k1}$, $H_{k2}$ and/or saturation magnetizations, $M_{s1}$, $M_{s2}$, may be parameterized as an anisotropy ratio:

$$K_{1,2} = \frac{M_{s2} H_{k2}}{M_{s1} H_{k1}} \qquad [3]$$

In some implementations, the first magnetic element may be a magnetically hard grain having a relatively higher anisotropy than the anisotropy of the second magnetic element, which may be a relatively magnetically soft grain, i.e., $H_{k1} > H_{k2}$. The exchange coupling interaction parameter, $h_{ex}$, between the first and second magnetic elements may be parameterized as:

$$h_{ex} = J \frac{M_{s2}}{H_{k1}}, \qquad [4]$$

where J represents the exchange coupling strength between magnetic elements, e.g., in the case of first and second grains, the intergranular exchange coupling strength.

The exchange coupling interaction parameter, $h_{ex}$, represents the effect of the magnetization of the second element on the first magnetic element given the exchange coupling strength, J. Two exchanged coupled grains having anisotropy ratio of $K_{1,2}=1$ and exchange coupling parameter $h_{ex}=0.8$ provides good correspondence to a single grain with coherent magnetization.

For a coupled structure, the volumes of the individual magnetic elements, the anisotropies of the individual magnetic elements, and the saturation magnetizations of the individual magnetic elements and/or the exchange coupling between the magnetic elements may be selected to achieve both a predetermined thermal stability criterion corresponding to about 60 to about 90 $k_B T$ at a storage temperature (e.g., about 300K) and a predetermined EASFD in a range of about 2% to about 200%.

For example, in HAMR applications, the EASFD may be achieved for a write temperature of the coupled magnetic elements greater than about 350K. The anisotropy of one or both of the magnetic elements may be up to about 200 k Oe at room temperature (300K). For example, in some cases, a first magnetic element in the coupled set (denoted the "hard magnetic element") may have a higher anisotropy than the anisotropy of a second magnetic element in the coupled set (denoted the "soft magnetic element"). In this configuration, the hard magnetic element can have an anisotropy in a range of about 0.1 k Oe to about 200 k Oe at room temperature (300K) and the soft magnetic element may have any anisotropy that is less than the anisotropy of the hard magnetic element. The magnetic element can have magnetization saturation in a range of about 300 emu/cc to about 1000 emu/cc, the diameter of the magnetic elements may be between about 4 nm and about 12 nm and the volume of the magnetic elements maybe between about 80 nm$^3$ and about 10,000 nm$^3$. The exchange coupling interaction parameter, $h_{ex}$, may be between about 0.001 and about 10. The mean switching field may be about 80% the coercivity of the medium, which can range from about 30K Oe to about 100K Oe.

As can be appreciated by contemplating FIGS. 4C and 5C, discussed below, the switching field distribution, SFD, for the coupled magnetic elements is dependent on the anisotropy parameter, $K_{1,2}$, of the coupled magnetic elements. As one example, for coupled magnetic elements having $M_{s1}=M_{s2}$, the anisotropy of one of the magnetic elements, e.g., $H_{k2}$ of the first magnetic element, can be adjusted to achieve a reduction in the SFD to meet a predetermined SFD criterion at the HAMR writing temperature. However, a decrease in $H_{k2}$ decreases the thermal stability of the coupled system at the storage temperature. To maintain the predetermined thermal stability criterion at storage temperature, the volume of either element and/or the anisotropy, $H_{k1}$, of the first magnetic element would may need to be increased.

Figure 3:
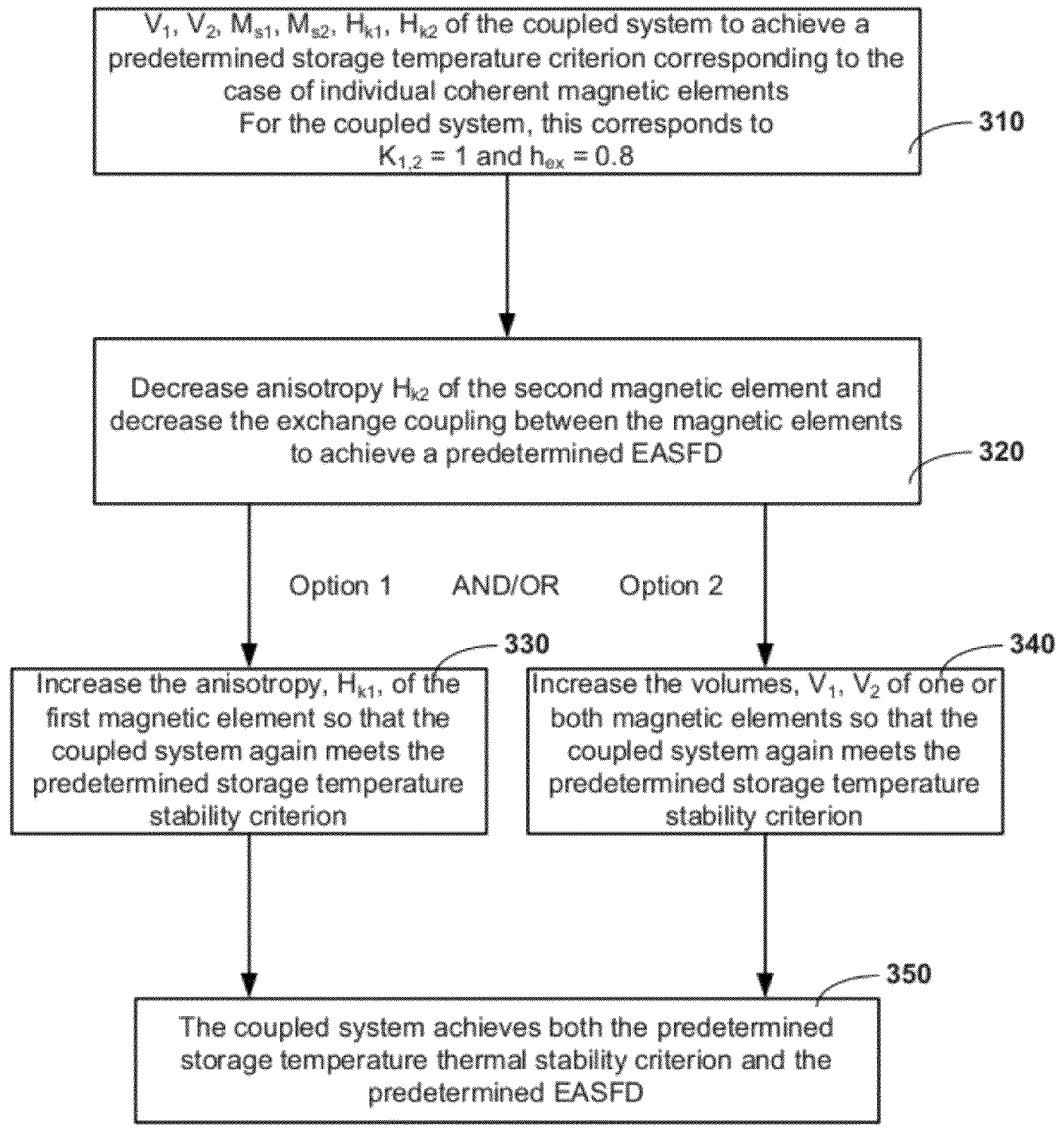
FIG. 3 is a flow diagram showing a process for tuning parameter values of the coupled magnetic elements to achieve both a predetermined write temperature SFD criterion and a predetermined storage temperature thermal stability criterion in accordance with some embodiments.

The flow diagram of FIG. 3 illustrates a process for selecting parameter values of the coupled magnetic elements to achieve both an EASFD criterion and a storage temperature thermal stability criterion. The first and second magnetic elements of each group of coupled magnetic elements can initially be considered to possess 310 grain volumes, $V_1$, $V_2$, saturation magnetizations, $M_{s1}$, $M_{s2}$, and anisotropies $H_{k1}$, $H_{k2}$ that achieve a predetermined storage temperature criterion corresponding to the case of an individual coherent magnetic element. For the coupled system, this corresponds to $K_{1,2}=1$ and $h_{ex}=0.8$. The anisotropy, $H_{k2}$, of the second magnetic element is decreased and the exchange coupling between the first and second magnetic elements is decreased 320 to achieve a predetermined EASFD criterion. For example, the EASFD may be an SFD at the HAMR write temperature or an SFD at the MAMR energy. Note that decreasing the exchange coupling is reflected in a decrease in $h_{ex}$. Decreasing $H_{k2}$ and decreasing the exchange coupling causes the coupled system to no longer meet the storage temperature thermal stability criterion.

As illustrated in FIG. 3, the storage temperature thermal stability criterion can be restored using Option 1, Option 2, or a combination of both Option 1 and Option 2. Option 1 involves increasing 330 the anisotropy, $H_{k1}$, of the first magnetic element (while maintaining the other parameters mentioned above at their previous values) until the coupled system again meets the storage temperature thermal stability criterion. Option 2 involves increasing 340 the volume, $V_1$, of the first magnetic element, the volume, $V_2$, of the second magnetic element, or both, while maintaining the other parameters mentioned above at their previous values, until the coupled system again meets the storage temperature thermal stability criterion. A combination of Option 1 and Option 2 may also be used wherein both the volumes of either or both elements and the anisotropy of the first magnetic element may be increased until the storage temperature thermal stability criterion is met. Using Option 1 and/or Option 2 allows the coupled system to achieve both the predetermined storage temperature thermal stability criterion and the predetermined write temperature SFD.

Figure 4A:
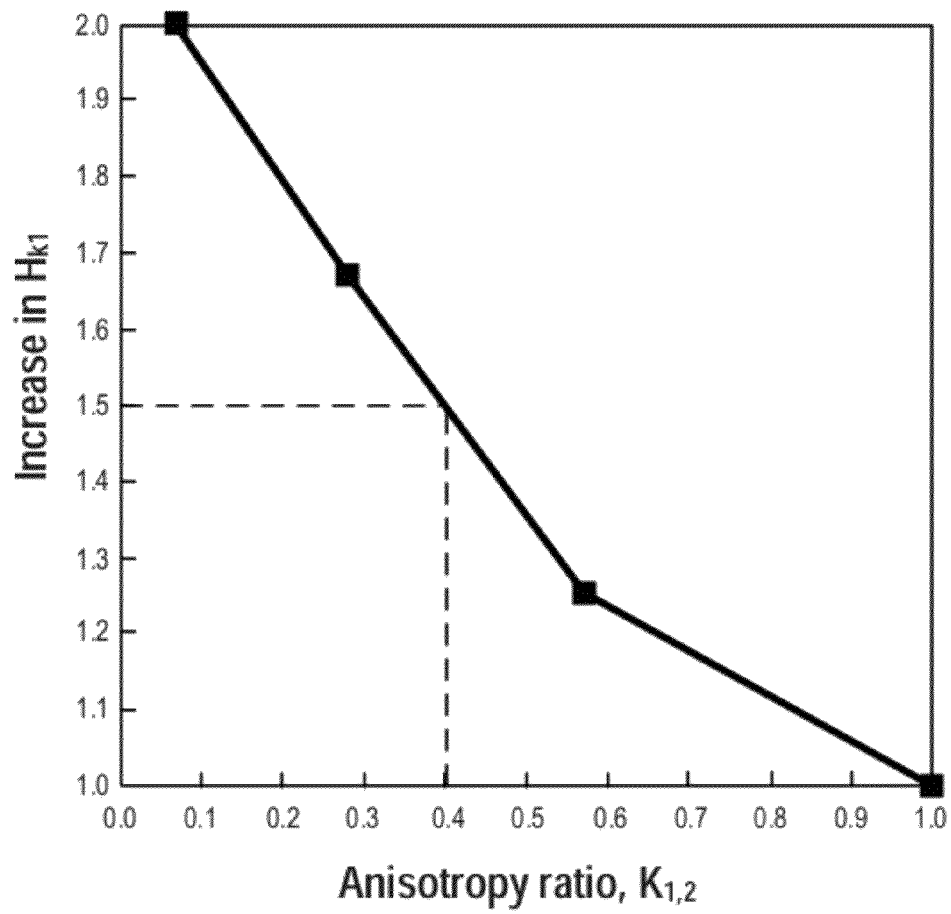
FIG. 4A is a graph that shows how much the anisotropy of the magnetic element $H_{k1}$ is increased to maintain the predetermined thermal stability when anisotropy ratio of an exchange coupled magnetic element, $K_{1,2}$ is decreased to achieve the predetermined SFD in accordance with some embodiments.
Figure 4B:
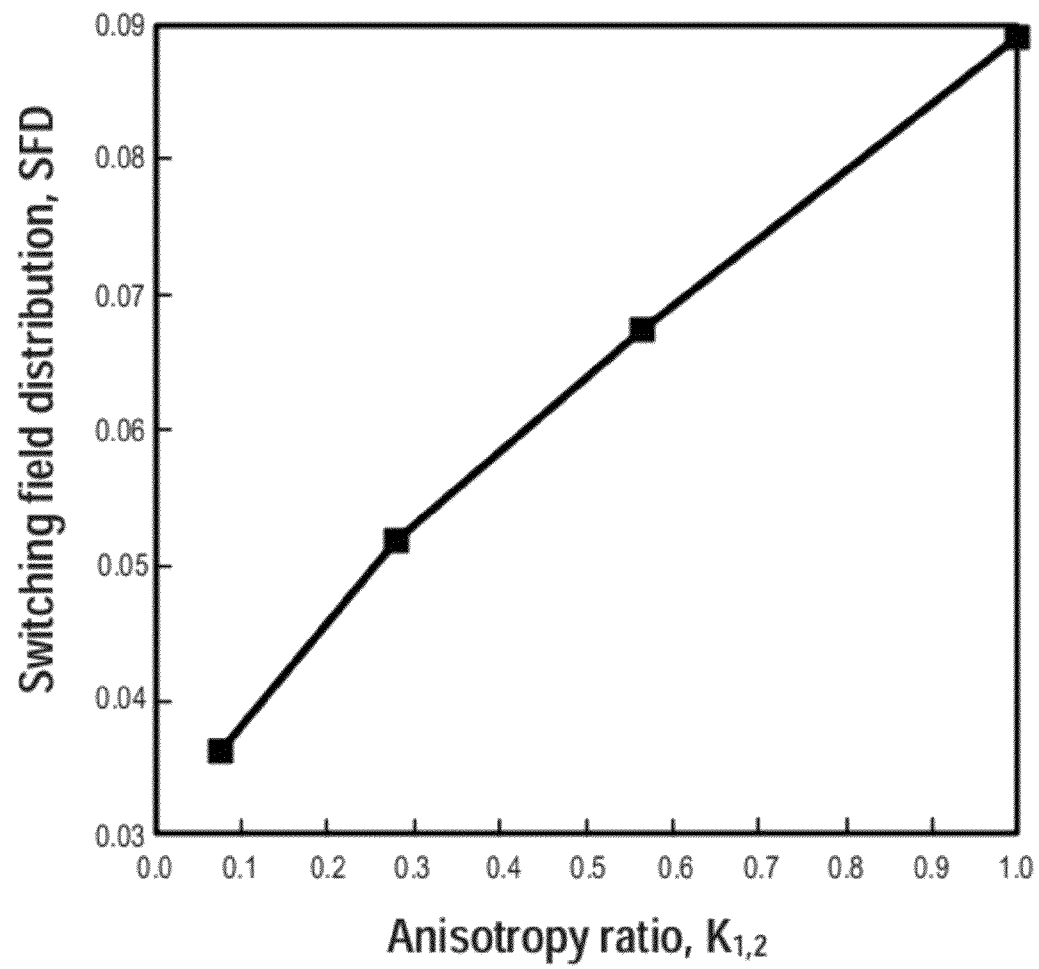
FIG. 4B is a graph illustrating the decrease in the write temperature SFD of the coupled magnetic elements as a function of the anisotropy ratio, $K_{1,2}$ in accordance with some embodiments.
Figure 4C:
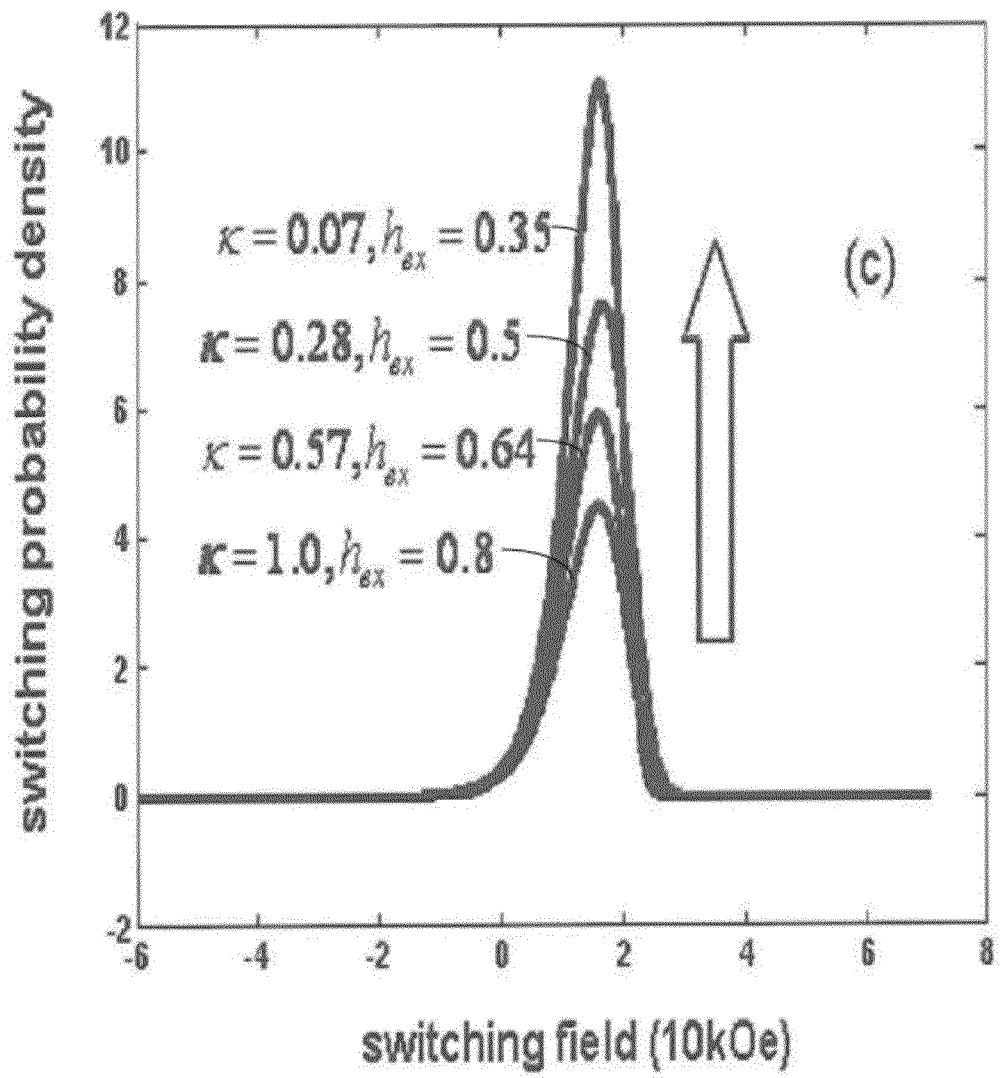
FIG. 4C graphically illustrates changes in the switching field probability density function as $H_{k1}$ is increased in accordance with some embodiments.

FIGS. 4A-4C illustrate how a reduction of the EASFD at the write temperature for HAMR can be achieved through Option 1 discussed previously in connection with FIG. 3. In this example, the grain volumes, $V_1$ and $V_2$, of the first and second magnetic elements are maintained unchanged from their initial values. The anisotropy, $H_{k2}$, of the second magnetic element is decreased and the exchange coupling between the magnetic elements is decreased to achieve a predetermined write temperature SFD. The decrease in $H_{k2}$ causes the anisotropy ratio $K_{1,2}$ to decrease. The anisotropy, $H_{k1}$, of the first magnetic element is increased to compensate for the reduction in $H_{k2}$ (which causes a decrease in $K_{1,2}$) so that the predetermined storage temperature thermal stability criterion is maintained. The graph of FIG. 4A shows how much the anisotropy, $H_{k1}$, of the magnetic element is increased to maintain the predetermined storage temperature thermal stability criterion when the anisotropy ratio of an exchange coupled magnetic element, $K_{1,2}$ is decreased to achieve the predetermined write temperature SFD. As one example, if the decrease in $H_{k2}$ causes the anisotropy ratio, $K_{1,2}$ to decrease to 0.4, then $H_{k1}$ can be increased to 1.5 times the initial $H_{k1}$.

FIG. 4B shows the decrease in the write temperature SFD of the coupled system as a function of the anisotropy ratio, $K_{1,2}$. FIG. 4C graphically illustrates changes in the switching field probability density function as $H_{k1}$ is increased. Increasing $H_{k1}$ causes a corresponding decrease in $K_{1,2}$, $h_{ex}$, and SFD. The probability density functions of FIG. 4C generally correspond to normal distributions having a mean switching field magnitude in this example of about 16000 Oe. The SFD is the standard deviation of the switching field probability density function divided by the mean switching field. The first graph in FIG. 4C corresponds to $K_{1,2}=1.0$ and $h_{ex}=0.8$; the second graph corresponds to $K_{1,2}=0.57$ and $h_{ex}=0.64$; the third graph corresponds to $K_{1,2}=0.28$ and $h_{ex}=0.5$; and the fourth graph corresponds to $K_{1,2}=0.07$ and $h_{ex}=0.35$.

Figure 5A:
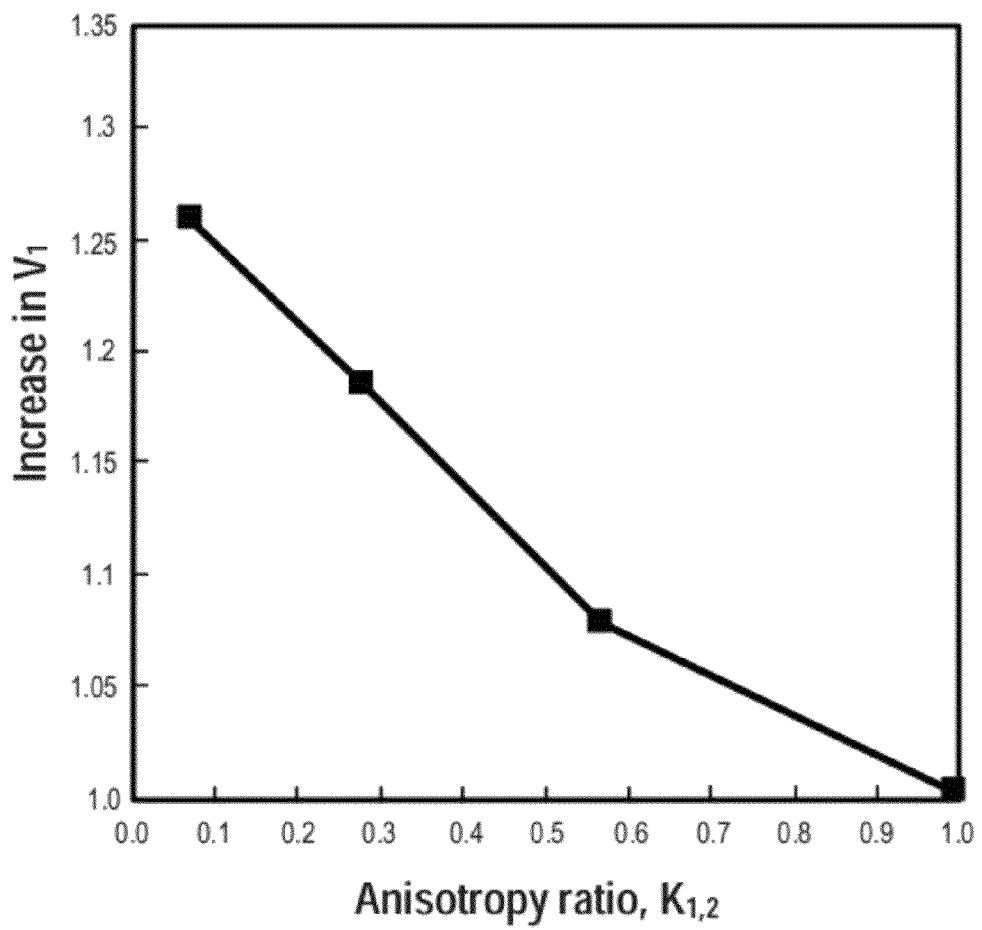
FIG. 5A is a graph that shows how much the volume $V_1$, of a first magnetic element is increased to maintain the predetermined thermal stability, when the anisotropy ratio, $K_{1,2}$ of coupled magnetic elements is decreased to achieve the predetermined SFD in accordance with some embodiments.
Figure 5B:
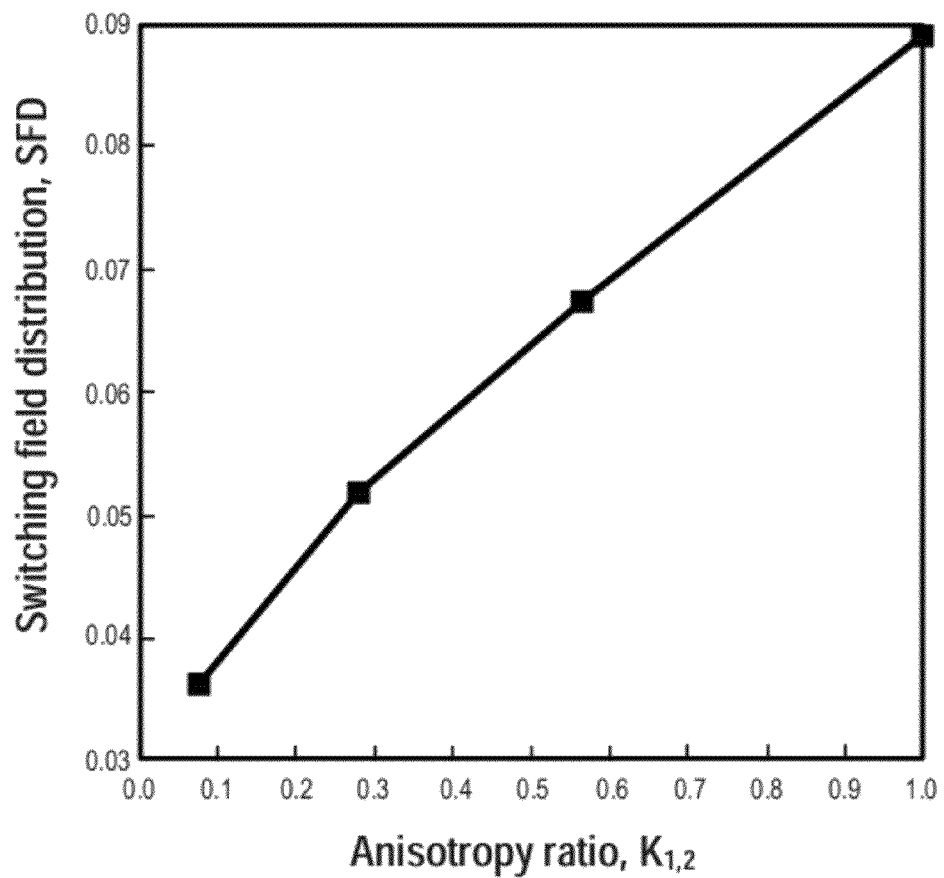
FIG. 5B graphically shows the decrease in the write temperature SFD of the coupled magnetic elements as a function of the anisotropy ratio, $K_{1,2}$ in accordance with some embodiments.
Figure 5C:
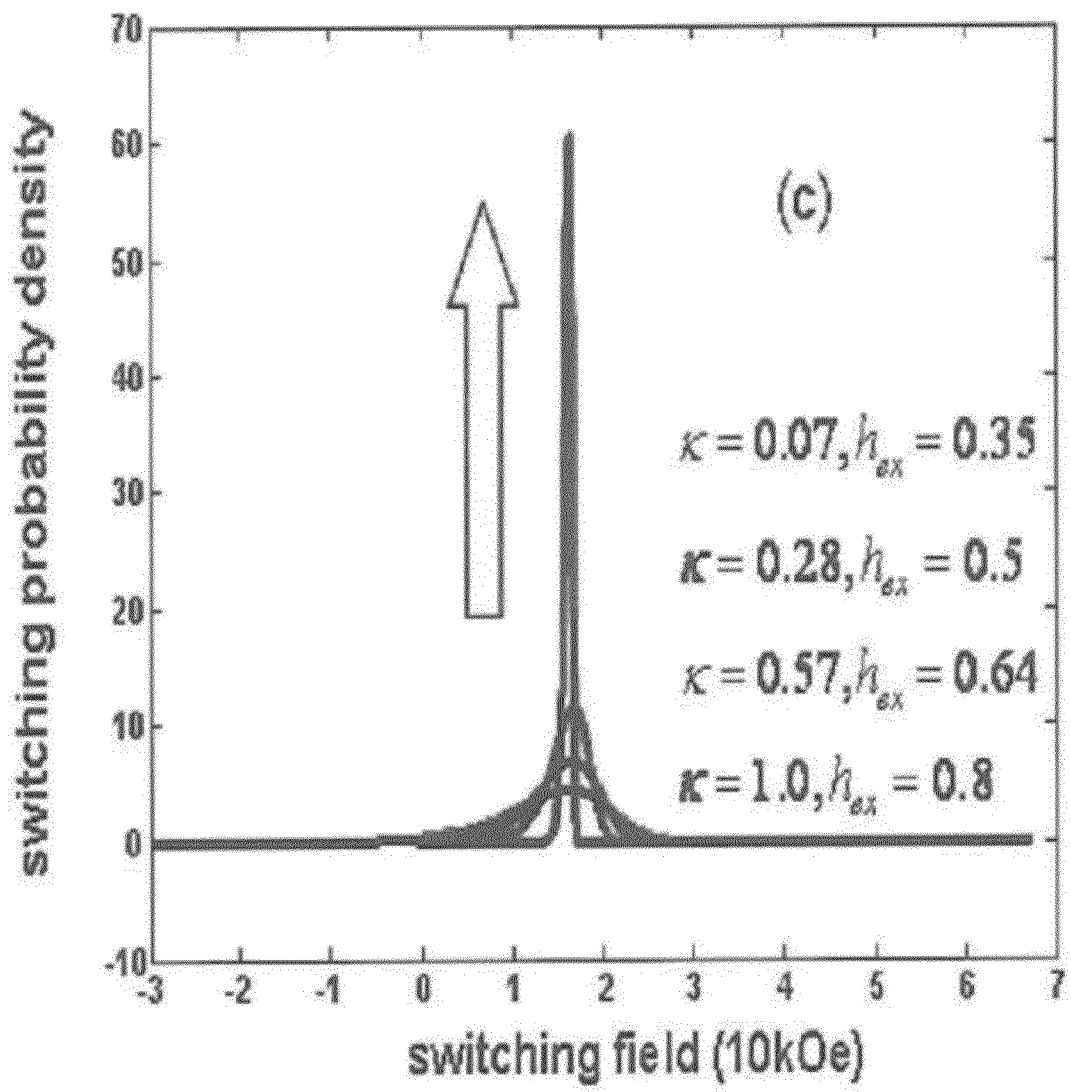
FIG. 5C graphically illustrates changes in the switching field probability density function as $V_1$ is increased in accordance with some embodiments.
Figure 6:
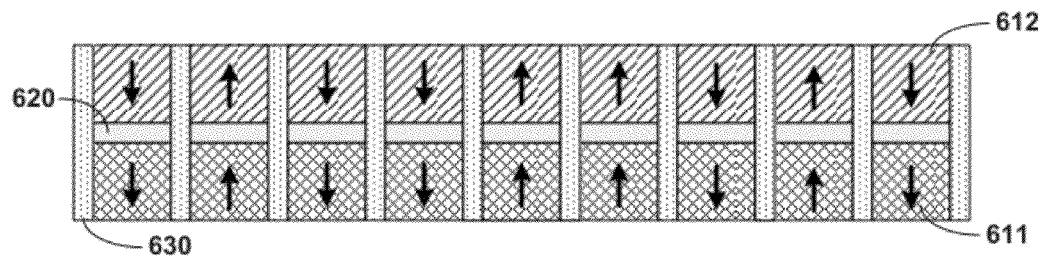
FIGS. 6-13 depict various configurations for sets of exchange coupled magnetic elements in accordance with various embodiments.
Figure 7:
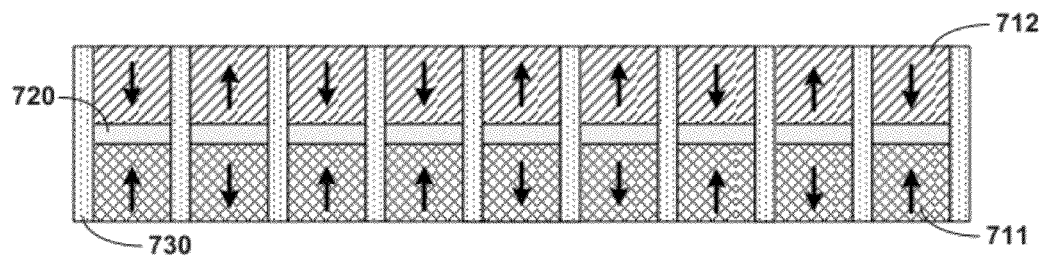

FIGS. 5A-5C illustrate how a reduction of the SFD at the writing temperature can be achieved through Option 2 discussed previously in connection with FIG. 3. In this example, the anisotropies, $H_{k1}$ and $H_{k2}$, of the first and second magnetic elements are maintained unchanged from their initial values. The volume, $V_1$, of the first magnetic element is increased to compensate for the reduction in $H_{k2}$ and the corresponding decrease in $K_{1,2}$, so that the predetermined storage temperature thermal stability criterion is maintained. FIG. 5A is a graph that shows how much the volume $V_1$, of a first magnetic element is increased to maintain the predetermined storage temperature thermal stability, when the anisotropy ratio, $K_{1,2}$ of coupled magnetic elements is decreased to achieve the predetermined write temperature SFD.

FIG. 5B shows the write temperature SFD of the coupled system as a function of the anisotropy ratio, $K_{1,2}$. FIG. 5C graphically illustrates changes in the switching field probability density function as $V_1$ is increased. As illustrated in FIG. 5C, increasing $V_1$ causes a corresponding decrease in $K_{1,2}$, $h_{ex}$, and SFD. As in the previous discussion of Option 1, the probability density functions of FIG. 5C generally correspond to normal distributions having a mean switching field magnitude of about 16000 Oe.

FIGS. 6-13 are diagrams that illustrate sets of coupled magnetic storage elements 611, 612, 711, 712, 811, 812, 911, 912, 1011, 1012, 1111, 1112, 1211, 1212, 1311, 1312, 1313 that may be arranged, e.g., in a magnetic recording medium, to achieve the dual specifications of a predetermined thermal stability at the storage temperature of the device and a predetermined EASFD for energy assisted write operations. Multiple ones of the magnetic storage elements 611, 612, 711, 712, 811, 812, 911, 912, 1011, 1012, 1111, 1112, 1211, 1212, 1311, 1312, 1313 shown in FIGS. 6-13 can be incorporated into magnetic media, such as thin film patterned or non-patterned magnetic media for hard magnetic disks drives (HDD). One or more sets of the coupled magnetic elements 611, 612, 711, 712, 811, 812, 911, 912, 1011, 1012, 1111, 1112, 1211, 1212, 1311, 1312, 1313 shown in FIGS. 6-13 may be incorporated into MRAM devices, for example. The energy assistance used to write the magnetic elements shown in FIGS. 6-13 could be thermal energy or microwave energy, for example. In some cases, one set of coupled magnetic elements is used to store one bit of information. In some cases, multiple sets of coupled magnetic elements are be used to store one bit of information.

Note that In FIGS. 6-13, the longer dimension of the paper is designated the vertical axis and the shorter dimension is designated the horizontal axis. These designations are arbitrarily chosen for convenience and the terms "vertical" and "horizontal" used in this context are not limiting with regard to the orientation of magnetic elements and/or devices.

Figure 8:
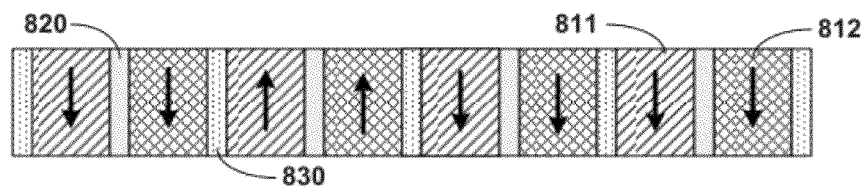
Figure 9:
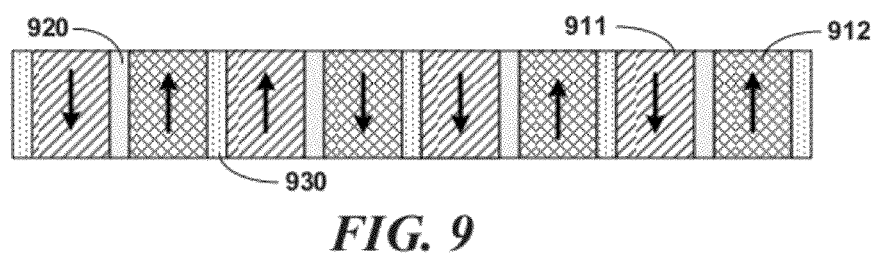
Figure 10:
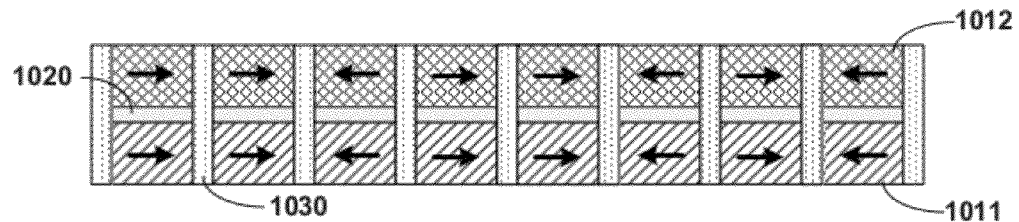
Figure 11:
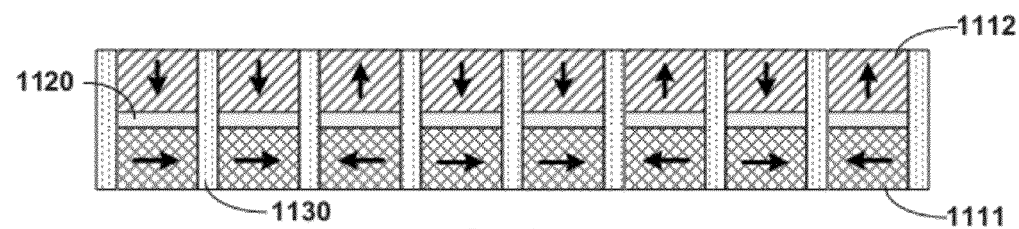
Figure 12:
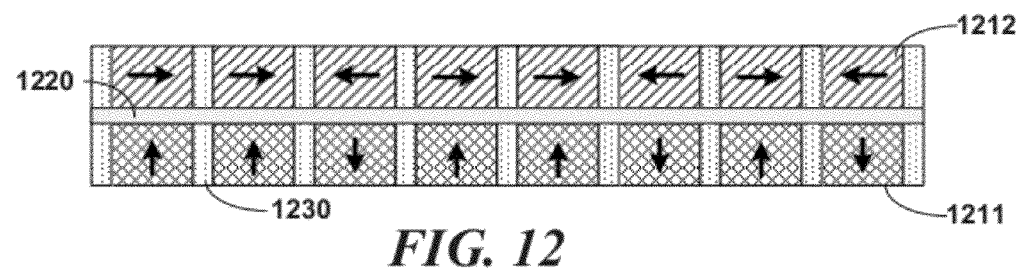
Figure 13:
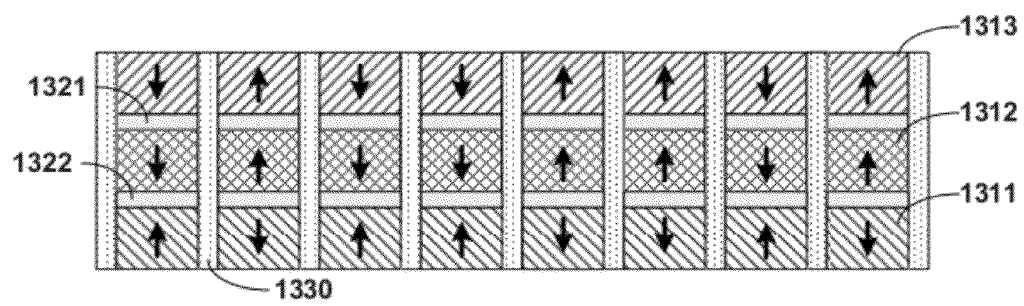

FIGS. 6, 7, and 10-13 show in cross section two or three layers of vertically coupled magnetic element sets. FIGS. 8 and 9 each show a single layer of horizontally coupled magnetic element sets. The elements of each coupled magnetic element set are separated from one another by an exchange coupling material 620, 720, 820, 920, 1020, 1120, 1220, 1321, 1322 disposed between the coupled magnetic elements. An exchange decoupling material 630, 730, 830, 930, 1030, 1130, 1230, 1330 is disposed between non-coupled magnetic elements. As previously discussed, the exchange coupling layer 620, 720, 820, 920, 1020, 1120, 1220, 1321, 1322 can be used to tune the exchange coupling to achieve the predetermined thermal stability and EASFD. Note that the term "sets" may encompass 2 or more magnetic elements. For example, FIG. 13 illustrates coupled sets that include three vertically coupled magnetic elements 1311, 1312, 1313.

The length, width, diameter, and/or thickness of first magnetic elements of the sets can be the same as or different from the length, width, diameter, and/or thickness of the second and/or third magnetic elements in a coupled set. In some cases, the first magnetic elements arranged in a first magnetic layer have the same aspect ratio, i.e., length, width or diameter along the horizontal axis, as the second magnetic elements or third magnetic elements arranged in a second or third magnetic layer. The thickness of the first magnetic elements along the vertical axis may be the same as or different from the thickness of the second and/or third magnetic elements. Each of the magnetic elements may be a ferromagnetic crystalline grain. The exchange decoupling material may comprise non-magnetic material, such as an oxide. The amount of magnetic decoupling between the first magnetic elements may be about the same or may be different from the amount of magnetic decoupling between the second or third magnetic elements in the coupled sets.

In some cases, the first and/or second magnetic elements may comprise a Co based or CoCr based alloy such as CoPt—, CoCr—, CoCrPt—, FePt—X or XY, wherein X and/or Y are metallic or non-metallic, magnetic or nonmagnetic doping elements such as Ni, Cu, Ag, B, Si, O, C, N. In some cases, the first and/or second magnetic layers may comprise NiFe—, CoFe—, CoNiFe—X or XY, wherein X and/or Y comprise B, Ni or Mg. The exchange decoupling material may comprise one or more oxides such as B, Al, Cr, Hg, Mg, Si, Ta, Ti, and Zr oxide, for example. The first and/or second magnetic elements may comprise FePtX or CoPtX with $L1_0$ structure, for example.

In some implementations PtMn alloys such as $Pt_{10}Mn_{90}$ may be used in an interlayer disposed adjacent to one of the magnetic elements. For example, in embodiments that include a hard magnetic element and a soft magnetic element, the PtMn containing interlayer may be disposed adjacent to the soft magnetic element. The PtMn interlayer serves to stabilize the soft magnetic element by antiferromagnetically pinning the soft magnetic layer.

The easy axis anisotropy direction for the magnetic elements can lie along the horizontal axis, e.g., longitudinally in the plane of the magnetic medium, or can lie along the vertical axis, e.g., perpendicular to the plane of the magnetic medium. In some implementations, the coupled sets are homogeneous with regard to easy axis direction, wherein all of the magnetic elements in each coupled set have the same easy axis direction. For example, all of the magnetic elements in each coupled set may have vertical easy axis direction as in the sets illustrated in FIGS. 6-9. Alternatively, all of the magnetic elements in each coupled set may have horizontal easy axis direction as in the sets illustrated in FIG. 10.

In other implementations, the coupled sets are heterogeneous with respect to easy axis anisotropy direction wherein the first magnetic elements in a coupled set have a first easy axis anisotropy direction and the second magnetic elements in the coupled set have a second easy axis anisotropy direction. For example, in FIG. 11, the easy axis direction of first magnetic elements 1111 is along the horizontal axis and the easy axis direction of the second magnetic elements 1112 is along the vertical axis. FIG. 12 provides another example of coupled magnetic elements having heterogeneous easy axis direction.

One or more of the composition, thickness and/or deposition conditions of the exchange coupling layer can be used to control the type of exchange coupling and the amount of exchange coupling between the magnetic elements of a coupled set, as quantified by the exchange coupling interaction parameter, $h_{ex}$. In some implementations, an exchange coupling layer is used that facilitates direct ferromagnetic exchange coupling between the first and second elements. In these implementations, the exchange coupling layer can have a thickness of in a range between about 0 (no exchange coupling layer) to about 30 nm and can comprise magnetic materials such as CoFe, CoPt, FePt or CoNi.

The exchange coupling layer may comprise non-magnetic materials such as MgO, MgO—Cu, MgO—Mg, $TiO_2$, $Al_2O_3$, Mg, Ag, Cu, for example.

FeRh and/or other materials that change phase at thermally assisted write temperatures may be used in the exchange coupling layer to tune the exchange coupling between the first and second magnetic elements according to temperature.

Figure 16:
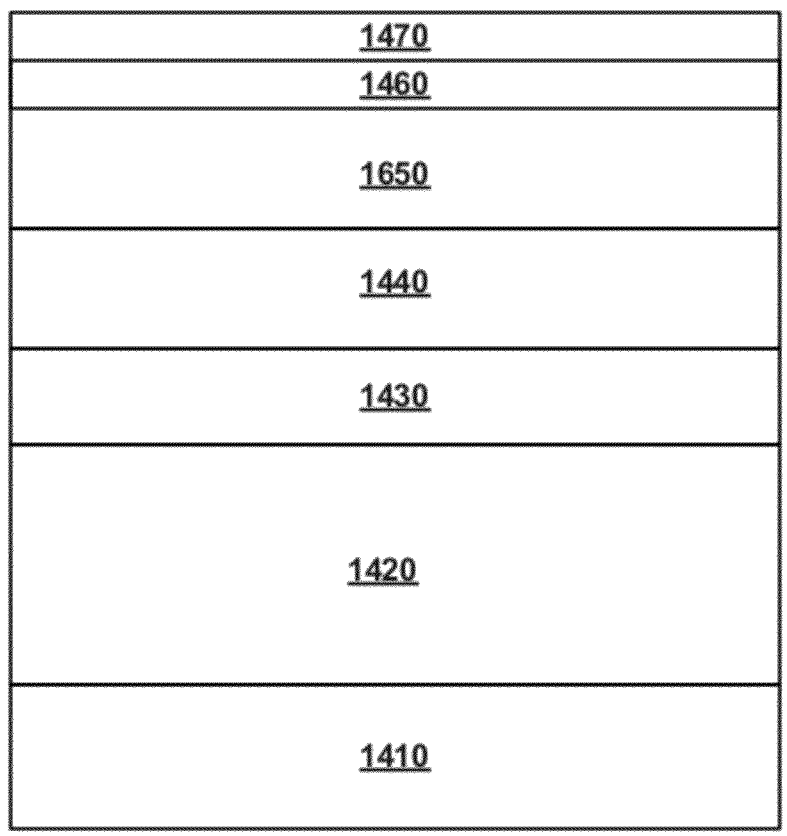
FIG. 16 is a schematic diagram that illustrates an implementation of a continuous magnetic recording medium comprising a single magnetic recording layer that includes first and second exchange coupled magnetic elements in accordance with some embodiments.

In some In some cases, the exchange coupling layer provides antiferromagnetic coupling between the first and second magnetic layers, as illustrated by FIGS. 11, 13, and 16. In these implementations, the exchange coupling layer can have a thickness of in a range between about 0 (no exchange coupling layer) to about 30 nm and can comprise materials such as Ru.

The materials used for the exchange coupling layer may also provide a template for growth of subsequently grown magnetic elements, in addition to providing exchange tuning the exchange coupling between the magnetic elements. As with the magnetic elements, in some cases, the exchange coupling layer may comprise crystalline grains that are separated by a non-magnetic material which substantially exchange decouples the crystalline grains. In some cases, the exchange coupling layer may include crystalline grains or other material structures, e.g., amorphous material, that are not substantially exchange decoupled.

Figure 14:
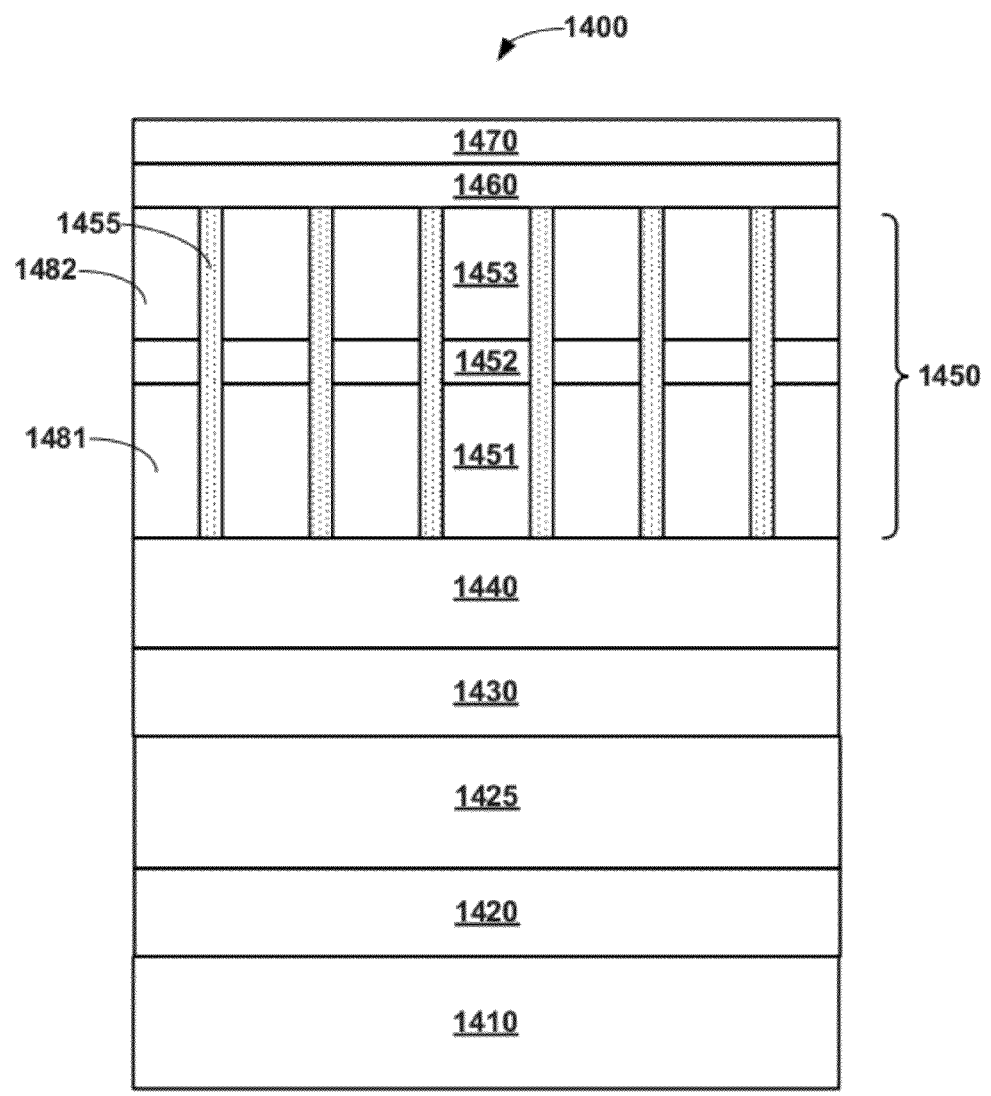
FIG. 14 is a schematic diagram that illustrates an implementation of continuous (non-patterned) magnetic recording medium that includes two layers of coupled grains arranged to achieve storage temperature thermal stability and write temperature SFD reduction in accordance with some embodiments.

FIG. 14 is a diagram of a magnetic medium 1400, suitable for use with energy assisted magnetic recording (EAMR), e.g., MAMR or HAMR, that uses the approaches for storage temperature thermal stability and write temperature SFD reduction discussed in this disclosure. The EAMR magnetic recording medium illustrated in FIG. 14 includes a magnetic recording layer 1450 disposed on a non-magnetic substrate 1410. The magnetic recording medium may also include a number of optional layers. For example, the illustrated configuration includes a soft magnetic underlayer 1420, a heat sink layer 1425, a seed layer 1430, an intermediate layer 1440, an overcoat layer 1460 and a lubrication layer 1470.

The non-magnetic substrate 1410 can comprise a variety of materials including ceramic glass, amorphous glass, aluminum or NiP coated AlMg.

The optional soft underlayer (SUL) 1420 may comprise iron alloys such as FeTaC and/or FeSiAl. The SUL can include amorphous cobalt alloys such as CoNbZr, CoTaZr, and CoFeTaZr. The SUL is optional and may not be used if sufficient head-field intensity can be obtained without the use of a SUL. In some cases, the SUL may also serve as a heatsink layer.

The heat sink layer 1425 can have a thickness of about 10 nm to about 1000 nm. Materials used for the heat sink layer 1425 can include Cu, Ag, Al, Au, CuZr, CoFe, FeCoB, FeAlN, FeAlSi, NiFe, CoZrNb and/or FeTaN. The heat sink layer can also include MgO, SiO2 and other oxide layer. The heatsink layer may comprise a plurality of laminated layers.

The seed layer 1430 provides a base for growing the magnetic recording layers. The seed layer causes the intermediate layer to achieve a higher crystalline orientation and isolates the intermediate layer from the SUL. The seed layer can have a thickness of about 1 nm to about 50 nm and can be used to control properties such as orientation and grain size of subsequently deposited layers. Materials for the seed layer are selected from among polycrystalline materials having a face centered cubic (FCC) structure or a hexagonal close packed (HCP) structure, and amorphous materials. For example, the seed layer may be an FCC comprising a material such as Pt that controls the orientation of the magnetic recording layer. In some configurations, the seed layer may comprise a material such as Ru or Rh, or a combination thereof, to control the grain size and facilitate epitaxial growth of the subsequently deposited magnetic layer. The seed layer may contain one or more of Ta, Ni, Cr, Cu, Ti, Fe, W, Co, Ru, Pt, Pd, and C. The seed layer may comprise MgO, CoFe, CoCr, Ru, TiC, indium tin oxide, AlN, ZnO or other metal oxides.

The intermediate layer 1440 may be formed of a mixture of a metal oxide and a non-magnetic alloy. The non-magnetic alloy may contain primarily Co and Cr. The intermediate layer 640 may have a granular structure. For example, the intermediate layer may comprise grains of a CoCr based alloy separated by the metal oxide at the boundaries of the CoCr grains. An intermediate layer having an appropriate granular structure helps to facilitate the formation of an appropriate microstructure in an initial growth layer of the magnetic recording layer 1450.

An interlayer comprising an alloy of PtMn, such as $Pt_{10}Mn_{90}$ may disposed adjacent the first magnetic recording layer 1451. In some implementations, the interlayer serves as an antiferromagnetic pinning layer to stabilize the first magnetic recording layer.

In this example, the magnetic recording layer 1450 includes a first magnetic layer 1451 comprising a plurality of first magnetic elements 1481 and a second magnetic layer 1453 comprising a plurality of second magnetic elements 1482. The approaches discussed herein are not limited to structures having two magnetic layers and more or fewer magnetic layers may be used. The magnetic layers 1451, 1453 may comprise magnetic elements 1481, 1482 that are crystalline grains. The magnetic layers 1451, 1453 are separated from one another by an exchange coupling layer 1452 which is used to tune the exchange coupling between the magnetic elements 1481, 1482 to achieve the predetermined EASFD and storage temperature thermal stability as described herein.

The magnetic elements 1481, 1482 of the first and second magnetic layers 1451, 1453 are physically separated and magnetically decoupled from one another by an exchange decoupling material 1455 disposed at the grain boundaries between the elements 1481, 1482. In some configurations, the exchange coupling layer 1452 may also have a granular structure that includes physical separation and/or magnetic decoupling at the grain boundaries using the exchange decoupling material 1455. The grains that form the first and second magnetic elements 1481, 1482 may have the same aspect ratio as the grains of the exchange decoupling layer 1452. The first magnetic elements 1481 of the first magnetic layer 1451 may serve as a template upon which the exchange coupling layer 1452 is formed and the exchange coupling layer 1452 may serve as a template upon which the second magnetic grains 1482 of the second magnetic layer 1453 are formed so that all the layers 1451-1453 in the magnetically coupled set have a similar granular structure.

The material composition and structure of the magnetic recording layer 1450 may be similar to the material compositions and structures discussed in connection with FIGS. 6-13.

Figure 15:
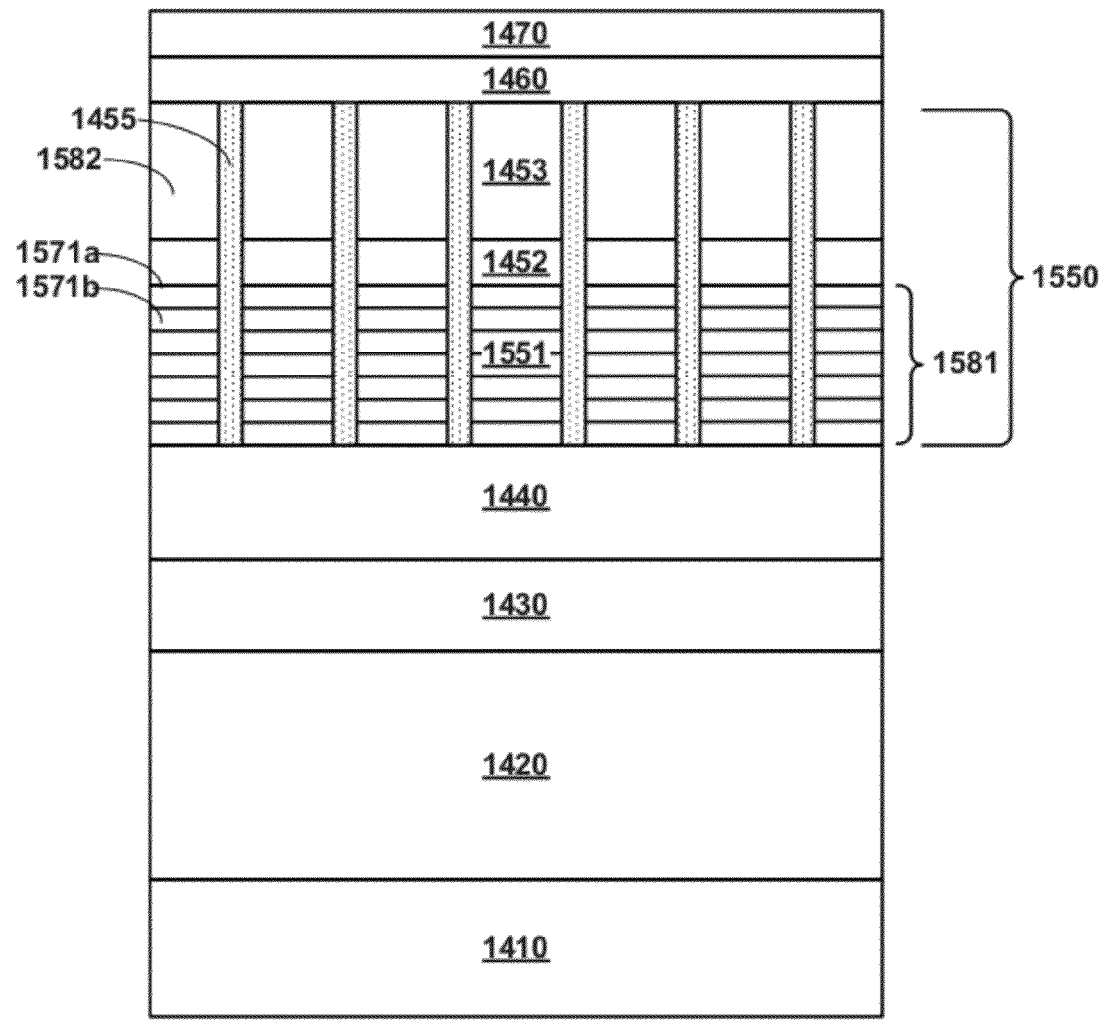
FIG. 15 is a schematic diagram that illustrates a continuous (non-patterned) magnetic recording medium that includes two layers of coupled magnetic elements, wherein one of the layers is a superlattice stack in accordance with some embodiments.

FIG. 15 illustrates another example of a continuous (non-patterned) EAMR magnetic medium 1500 that can be configured to achieve the storage temperature stability criterion and writing temperature SFD for HAMR or MAMR according to the approaches discussed herein. In this example, the substrate 1410, optional SUL 1420, seed layer 1430, intermediate layer 1440, exchange coupling layer 1451, overcoat 1460, and lubricant layer 1470 may be similar to the example discussed with reference to FIG. 14.

The magnetic recording layer 1550 of FIG. 15 includes a multilayer film as the first magnetic layer 1551. The multilayer film 1551 includes alternating layers 1551a, 1551b which may be alternating layers of Co and Pt or Pd. For example, each of the Co layers 1551a may have a thickness of about 0.1 nm to about 1.0 nm and each of the Pt or Pd layers 1551b may have a thickness of about 0.1 to about 2 nm. The total thickness of the first magnetic layer 1551 may be less than about 20 nm. As before, the ferromagnetic materials of the first magnetic layer may be segregated into first magnetic elements 1581 with a non-magnetic material 1455, such as an oxide, separating the elements 1581. The second magnetic layer 1453 includes the second magnetic elements and may have a structure and composition as described in connection with FIGS. 6-13. In some embodiments, the structure of the first and second magnetic layers may be reversed, i.e., the second magnetic layer may be a multilayer film. In some embodiments, both the first and the second magnetic layers may comprise multilayer films.

FIG. 16 illustrates yet another structure of a continuous (non-patterned) EAMR magnetic medium 1600 that can be configured to achieve the storage temperature stability criterion and write temperature SFD for HAMR or MAMR according to the approaches discussed herein. In this example, the substrate 1410, optional SUL 1420, seed layer 1430, intermediate layer 1440, overcoat 1460 and lubricant layer 1470 may be similar to the example discussed with reference to FIG. 14. Instead of a magnetic recording layer that comprises multiple layers comprising vertically coupled magnetic elements as depicted in FIGS. 14 and 15, the magnetic recording layer 1650 of FIG. 16 comprises at least one magnetic layer that includes horizontally exchange coupled sets of magnetic elements. The magnetic elements can be aligned in the plane of the at least one magnetic layer 1650 to form exchange coupled sets as illustrated, for example, in FIGS. 8 and 9. The composition of the first and second magnetic elements may be as previously described in connection with FIGS. 6-13.

For example, the magnetic layer 1650 may comprise sets of side-by-side first and second magnetic elements, as illustrated, for example, in FIGS. 2B and 2D, or sets having a first magnetic element surrounded by a second magnetic element, as depicted in FIG. 2E; or sets comprising a first group of first magnetic elements surrounded by a second group of second magnetic elements as in FIG. 2F. The magnetic elements may comprise grains of a magnetic material. The pattern of the first magnetic elements and the second magnetic elements may be formed, for example, by selectively masking and doping regions of the magnetic layer to form the first and second magnetic elements.

According to some implementations, approaches for achieving both a storage temperature thermal stability criterion and a write temperature SFD criterion can be applied to patterned media such as discrete track media (DTM) and/or bit patterned media (BPM). According to some implementations, DTM and BPM include patterns of protrusions and recesses formed as part of a magnetic recording layer. The protrusions correspond to recording elements and the recesses can serve to magnetically and/or thermally isolate the recording elements from one another. The protrusions and recesses may be formed by lithography, machining, etching and/or other fabrication processes.

Figure 17:
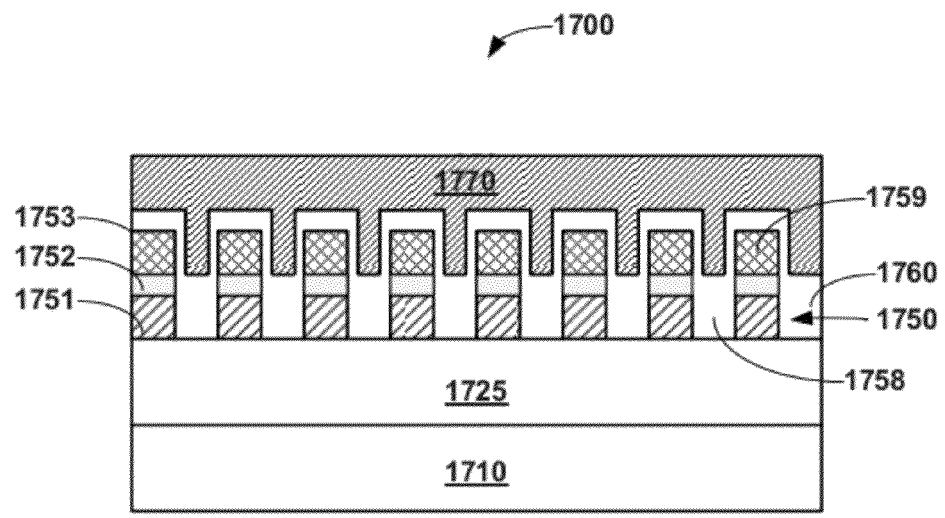
FIG. 17 is an example of a patterned medium that includes first and second exchange coupled, vertically aligned magnetic elements in accordance with some embodiments.

FIG. 17 illustrates an implementation of a BPM EAMR medium 1700 that is configured to achieve storage temperature thermal stability and write temperature SFD as discussed herein. The medium 1700 includes a substrate 1710 and an optional heatsink layer 1725. A magnetic recording layer 1750 includes protrusions 1759 separated by recesses 1758. Each of the protrusions 1759 of the magnetic recording layer 1750 includes a set of first and second magnetic elements 1751, 1753 which are vertically magnetically exchange coupled. The first and second magnetic elements 1751, 1753 may be separated from each other by an exchange coupling layer 1752. Protective overcoat 1760 and lubrication layers 1770 are formed on the magnetic recording layer 1750. Although the protrusions 1759 are illustrated in FIG. 17 as generally rectangular, the protrusions may take on other shapes. For example, in some applications the protrusions can have sloped or non-linear sides and/or can have a hemispherical shape.

Figure 18:
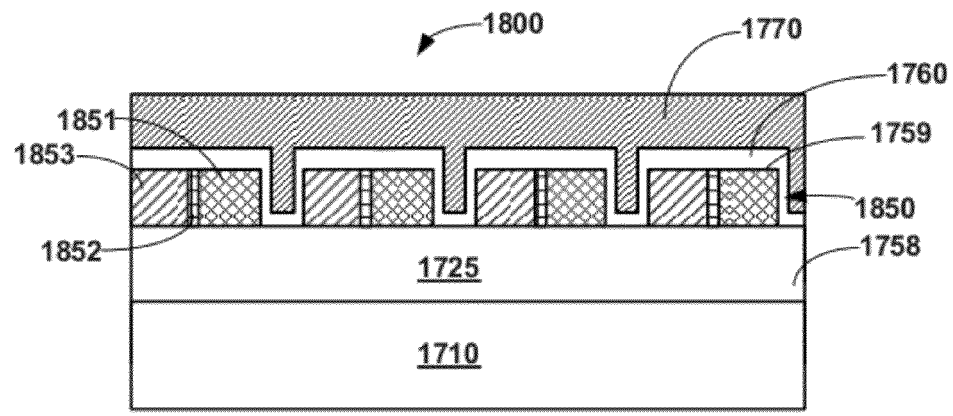
FIG. 18 is an example of a patterned medium that includes first and second exchange coupled, horizontally aligned magnetic elements in accordance with some embodiments.

The BPM EAMR medium 1800 illustrated in FIG. 18 is similar to the medium 1700 except that the magnetic recording layer 1850 includes magnetic elements 1851, 1853 which lie side by side and are horizontally exchange coupled through exchange coupling layer 1852.

Figure 19:
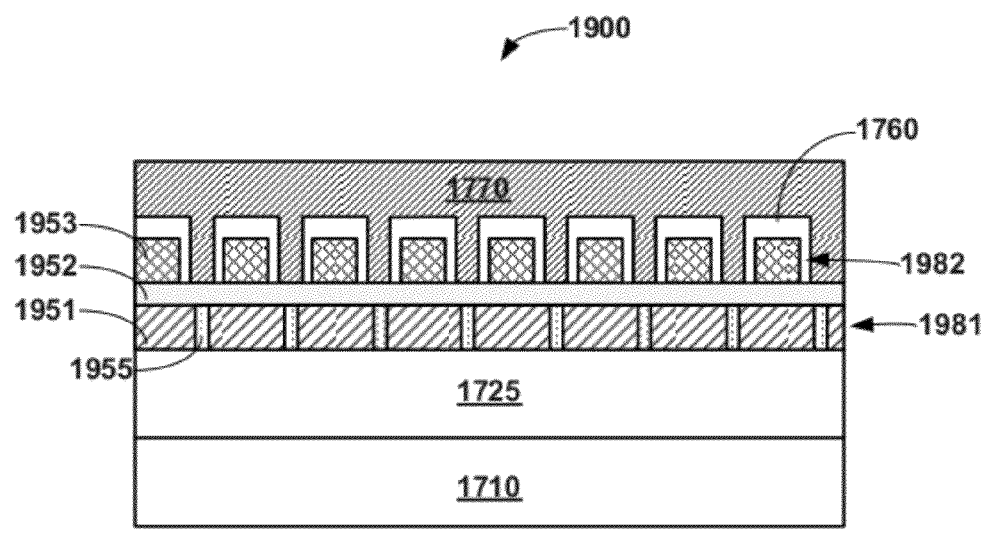
FIG. 19 is an example of a patterned medium that includes exchange coupled magnetic elements, first magnetic elements disposed in a continuous layer and second magnetic elements disposed in a patterned layer in accordance with some embodiments.

FIG. 19 illustrates a BPM EAMR medium 1900 having a magnetic layer that includes a patterned layer 1982 and a non-patterned layer 1981 that are exchange coupled through exchange coupling layer 1952. The non-patterned layer 1981 may be a granular layer having multiple crystalline grains separated by an exchange decoupling material. The grains of the non-patterned layer comprise the first magnetic elements 1951 that are exchange coupled to second magnetic elements 1953 of the second magnetic layer 1982. The magnetic medium includes a substrate 1710, optional heatsink 1725, protective overcoat 1760 and lubrication layers 1770 as previously described. The first magnetic elements 1951 and the second magnetic elements 1953 are exchange coupled to achieve the predetermined thermal stability criterion and EASFD as previously discussed.

The magnetic elements of patterned magnetic layers 1750, 1850, 1982 in FIGS. 17-19 and/or the non-patterned layer 1981 in FIG. 19 may comprise any of the magnetic materials previously discussed in connection with FIGS. 6-13.

Figure 20A:
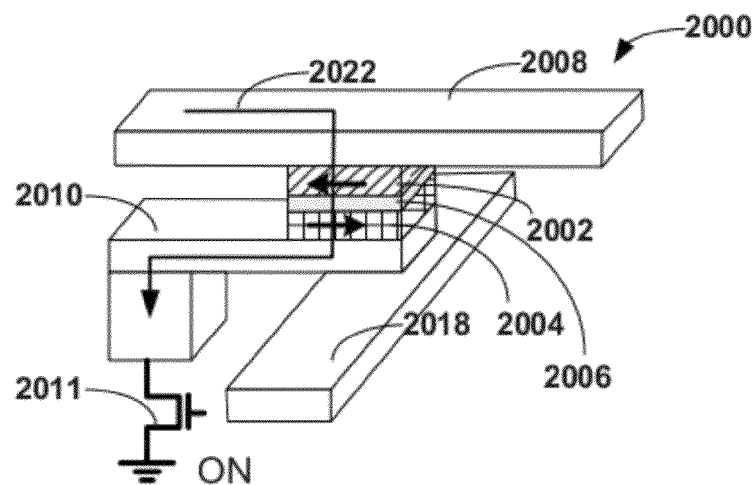
FIGS. 20A and 20B illustrate the read and write operations of a magnetoresistive random access memory cell which may include exchange coupled magnetic elements in accordance with some embodiments.
Figure 20B:
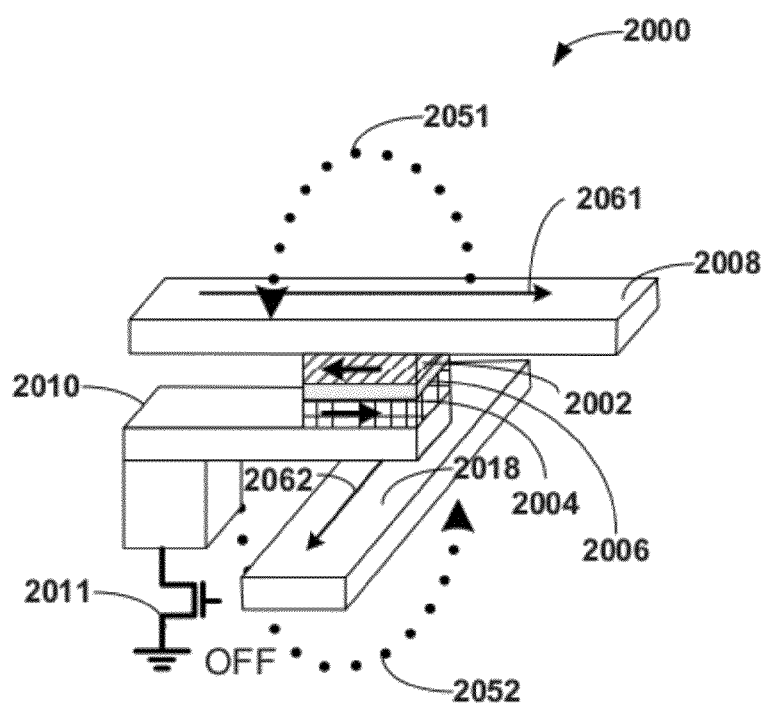

Exchange coupled memory elements to achieve the dual constraints of a predetermined thermal stability at the storage temperature of the device and a predetermined write SFD for energy assisted write operations may also be used in conjunction with energy assisted MRAM. MRAM uses a selection matrix to addressably access magnetoresistive devices. An MRAM cell comprises a magnetic tunnel junction (MJT) coupled to a selection circuit. FIGS. 20A and 20B illustrate the operation of a magnetically switched magnetoresistive random access memory (MRAM) cell 2000. MRAM cell 2000 includes a free layer 2002, a reference layer 2004 and a barrier layer 2006 between the free layer 2002 and the reference layer 2004. Electrical contact is made to the MRAM cell 2200 by a top electrical contact layer 2008 and a bottom electrical contact layer 2010.

FIGS. 20A and 20B illustrate read and write operations, respectively, for an MRAM cell 2000. The MRAM cell 2000 is connected to selection transistor 2011. As illustrated by FIG. 20A, when the MRAM cell is read, then selection transistor 2011 is on causing a current 2022 to flow through the MRAM cell 2000. The resistance of the MRAM device is determined to be either low or high depending on the magnetization orientation of the free layer 2002 relative to the reference layer 2004. As illustrated by FIG. 20B, when the MRAM cell 2000 is written to, the selection transistor 2011 is off. The combination of two orthogonal magnetic fields 2051, 2052, induced by currents 2061, 2062 in orthogonal conductors 2008, 2018 can cause the magnetic orientation of the free layer 2002 to flip from one state to another.

MRAM cells face similar thermal stability challenges as magnetic media. As device sizes shrink, the anisotropy of the materials may be increased to maintain thermal stability. However, when anisotropy increases, it becomes difficult to create the fields to write data to the device. Heat assisted MRAM (HA-MRAM) has been suggested in response to this trilemma.

HA-MRAM can be accomplished by heating the magnetic layers of the MRAM cell to decrease the magnetic field to write to the device. In some designs, a relatively low Cure temperature ferromagnetic field is used as the storage (free) layer. The cell is heated close to the Curie temperature and a magnetic field is generated by the digit line sets the write direction.

Figure 20C:
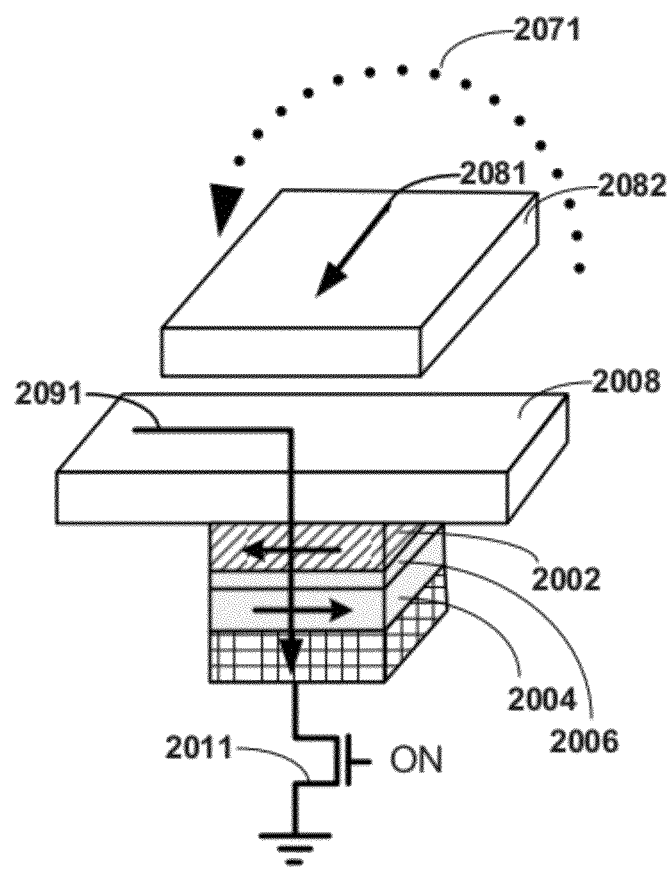
FIG. 20C illustrates a heat assisted MRAM write operation for an MRAM cell which may include exchange coupled magnetic elements in accordance with some embodiments.

Thermally assisting the writing process of a MRAM cell may involve circulating a current in the write lines of the device to heat the device above a write temperature to reduce the write fields. Another approach that involves heating directly with current flow through the device is illustrated in FIG. 20C. In this implementation, the selection transistor 2011 is turned on during the write operation allowing a current 2091 to flow through the device providing both Joule heating in the metallic layers and heating due to tunneling electrons. The magnetic field 2071, induced by current 2081 in conductor 2082 can cause the magnetic orientation of the free layer 2002 to transition from one magnetization state to another.

Figure 21:
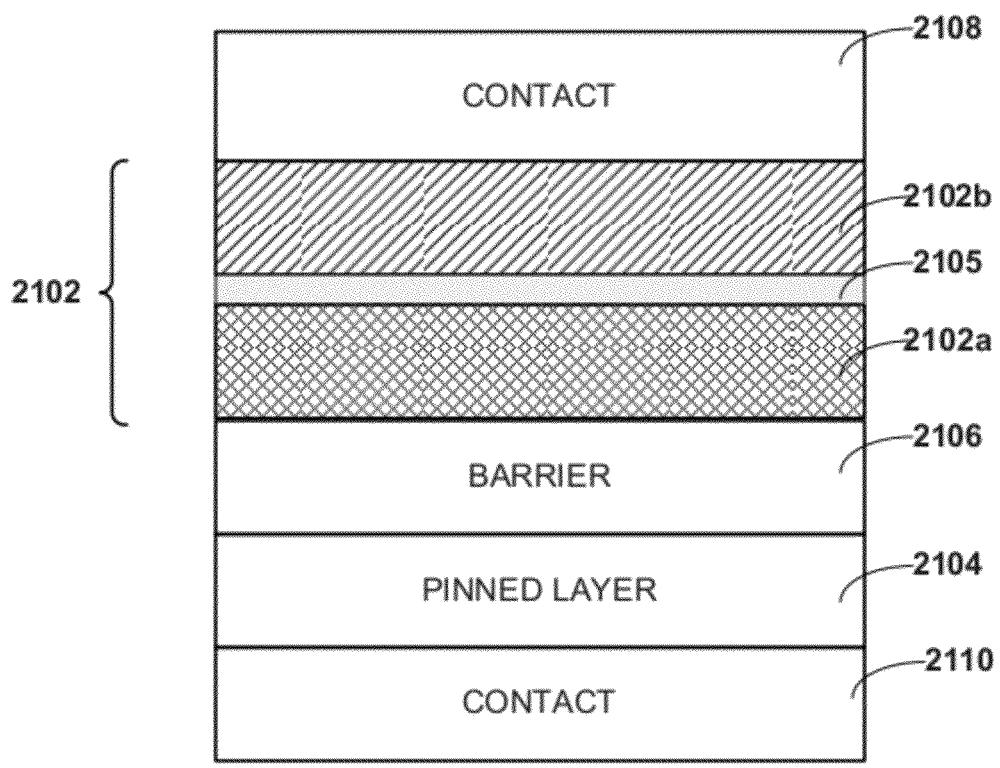
FIG. 21 shows a memory cell that includes coupled magnetic elements to achieve dual constraints of a predetermined energy assisted write operation and thermal stability at storage temperature in accordance with some embodiments.

The approaches to achieve a predetermined thermal stability in conjunction with a predetermined energy assisted write SDF using coupled magnetic elements can be applied to HA-MRAM devices. The HA-MRAM device illustrated in FIG. 21 includes top and bottom contact 2108, 2110, a pinned layer 2104, a barrier layer 2106 and a free layer 2103. In this case, the free layer 2102 is a multilayer structure comprising a first magnetic element 2102a exchange coupled to a second magnetic element 2102b through an exchange coupling layer 2205. The structure and composition of the coupled magnetic elements 2102a, 2102b can be similar to the structure and composition described in connection with the magnetic elements of FIGS. 2 and/or 6-13.

Various approaches and structures involving exchange coupled magnetic elements that may be implemented in devices as described herein are further discussed in commonly owned and concurrently filed U.S. patent application 13/077,948 which is incorporated herein by reference in its entirety.

Embodiments described in this disclosure can be practiced throughout the disclosed numerical ranges. The foregoing description of various embodiments has been presented for the purposes of illustration and description and not limitation. The embodiments disclosed are not intended to be exhaustive or to limit the possible implementations to the embodiments disclosed. Many modifications and variations are possible in light of the above teaching.

The invention claimed is:
1. A magnetic storage article, comprising:
first magnetic elements having anisotropy, $H_{k1}$, volume, $V_1$; and second magnetic elements magnetically exchange coupled to the first magnetic elements, the second magnetic elements having anisotropy $H_{k2}$, and volume $V_2$, wherein a thermal stability of the exchange coupled magnetic elements is greater than about $60\,k_BT$ at a storage temperature of about 300 K and a magnetic switching field distribution, SFD, of the exchange coupled magnetic elements is less than about 200% at a predetermined magnetic switching field and a predetermined assisting switching energy, wherein the first magnetic elements and the second magnetic elements are disposed in a single layer, the first magnetic elements are laterally adjacent to the second magnetic elements in the layer $H_{k1} \neq H_{k2}$ and $V_1 \neq V_2$.

2. The article of claim 1, wherein the assisting switching energy comprises thermal energy.

3. The article of claim 1, wherein the assisting switching energy comprises microwave magnetic energy.

4. The article of claim 1, wherein the magnetic storage article comprises heat assisted magnetic recording (HAMR) medium.

5. The article of claim 1, wherein the magnetic storage article is a microwave assisted magnetic recording (MAMR) medium.

6. The article of claim 1, wherein the magnetic storage article is magnetoresistive random access memory (MRAM).

7. The article of claim 1, wherein the magnetic storage article comprises a patterned medium.

8. The magnetic article of claim 1, wherein each of the first and second magnetic elements have a volume less than about 10,000 nm$^3$.

9. The article of claim 1, wherein the first magnetic elements have a saturation magnetization of $M_{s1}$, the second magnetic elements have a saturation magnetization of $M_{s2}$, and the ratio $M_{s2}H_{k2}/M_{s1}H_{k1}$ is less than about 0.8.

10. The article of claim 9, wherein $M_{s2}$ is equal to $M_{s1}$.

11. The article of claim 1, wherein the exchange field, $h_{ex}=JM_{s2}/H_{k1}$ is less than about 0.65, where J is the exchange coupling strength between the first magnetic elements and the second magnetic elements and $M_{s2}$ is the magnetization saturation of the second magnetic elements.

12. The article of claim 1, wherein the single layer is a continuous media layer.

13. The article of claim 12, wherein:
the second magnetic elements comprise CoPtX or CoCrPtX or CoCrX, where X is at least one additional non-magnetic metallic or non-metallic material; and
the first magnetic elements comprise FePtX or CoPtX, where X is at least one additional non-magnetic metallic or non-metallic material, with $L1_0$ structure.

14. The article of claim 1, wherein the second magnetic elements have a Curie temperature, $T_{c2}$, and $T_{c2}$ is not equal to a Curie temperature of the first magnetic elements, $T_{c1}$.

* * * * *